(12) United States Patent
Shobatake

(10) Patent No.: US 7,583,676 B2
(45) Date of Patent: Sep. 1, 2009

(54) ATM COMMUNICATION SYSTEM AND ATM COMMUNICATION METHOD

(75) Inventor: Yasuro Shobatake, Fort Lee, NJ (US)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 696 days.

(21) Appl. No.: 11/127,241

(22) Filed: May 12, 2005

(65) Prior Publication Data

US 2005/0213577 A1 Sep. 29, 2005

Related U.S. Application Data

(60) Continuation of application No. 09/703,790, filed on Nov. 2, 2000, now abandoned, which is a division of application No. 08/870,425, filed on May 28, 1997, now Pat. No. 6,157,645.

(30) Foreign Application Priority Data

May 28, 1996 (JP) .................................. 8-133090

(51) Int. Cl.
*H04L 12/28* (2006.01)
(52) U.S. Cl. .................... 370/395.1; 370/395.2; 725/37
(58) Field of Classification Search .................. 700/17, 700/83
See application file for complete search history.

(56) References Cited

U.S. PATENT DOCUMENTS

| | | | |
|---|---|---|---|
| 4,803,681 A | | 2/1989 | Takahashi |
| 5,153,578 A | | 10/1992 | Izawa et al. |
| 5,371,553 A | * | 12/1994 | Kawamura et al. ............ 725/59 |
| 5,452,291 A | | 9/1995 | Eisenhandler et al. |
| 5,500,794 A | | 3/1996 | Fujita et al. |
| 5,506,847 A | | 4/1996 | Shobatake |
| 5,509,001 A | | 4/1996 | Tachibana et al. |
| 5,537,605 A | * | 7/1996 | Teece ........................... 712/1 |
| 5,583,560 A | | 12/1996 | Florin et al. |
| 5,604,729 A | | 2/1997 | Aoki et al. |

(Continued)

FOREIGN PATENT DOCUMENTS

JP 7-44477 2/1995

(Continued)

*Primary Examiner*—Chi H Pham
(74) *Attorney, Agent, or Firm*—Oblon, Spivak, McClelland, Maier & Neustadt, P.C.

(57) ABSTRACT

An ATM cell transmission route is formed by hierarchically connecting a plurality of buses for connecting at least one first device and a plurality of second devices, and an ATM cell is to be transmitted from a first device designed to transmit/receive ATM cells and connected to one of the plurality of buses. The first device generates an ATM cell transmission message by inserting the ATM cell into a message in a format depending on the bus, and outputs an address for designating a device as the destination of the ATM cell transmission message by using a bus identifier for identifying one of the plurality of buses and a device identifier for identifying one of the plurality of devices. The ATM cell transmission message is then written in the device designated by the address. With this operation, an ATM communication system having a simple arrangement can be provided. In addition, ATM communication can be performed, with the QOS (quality of service) being guaranteed by priority control of an arbiter connected to one of the plurality of buses.

6 Claims, 18 Drawing Sheets

U.S. PATENT DOCUMENTS

| | | |
|---|---|---|
| 5,634,138 A | 5/1997 | Ananthan |
| 5,675,390 A | 10/1997 | Schindler et al. |
| 5,745,837 A * | 4/1998 | Fuhrmann .................. 725/114 |
| 5,781,228 A | 7/1998 | Sposato |
| 5,850,395 A | 12/1998 | Hauser |
| 5,898,688 A | 4/1999 | Norton et al. |
| 5,914,955 A | 6/1999 | Rostoker et al. |

FOREIGN PATENT DOCUMENTS

| | | |
|---|---|---|
| JP | 9-508509 | 8/1997 |

* cited by examiner

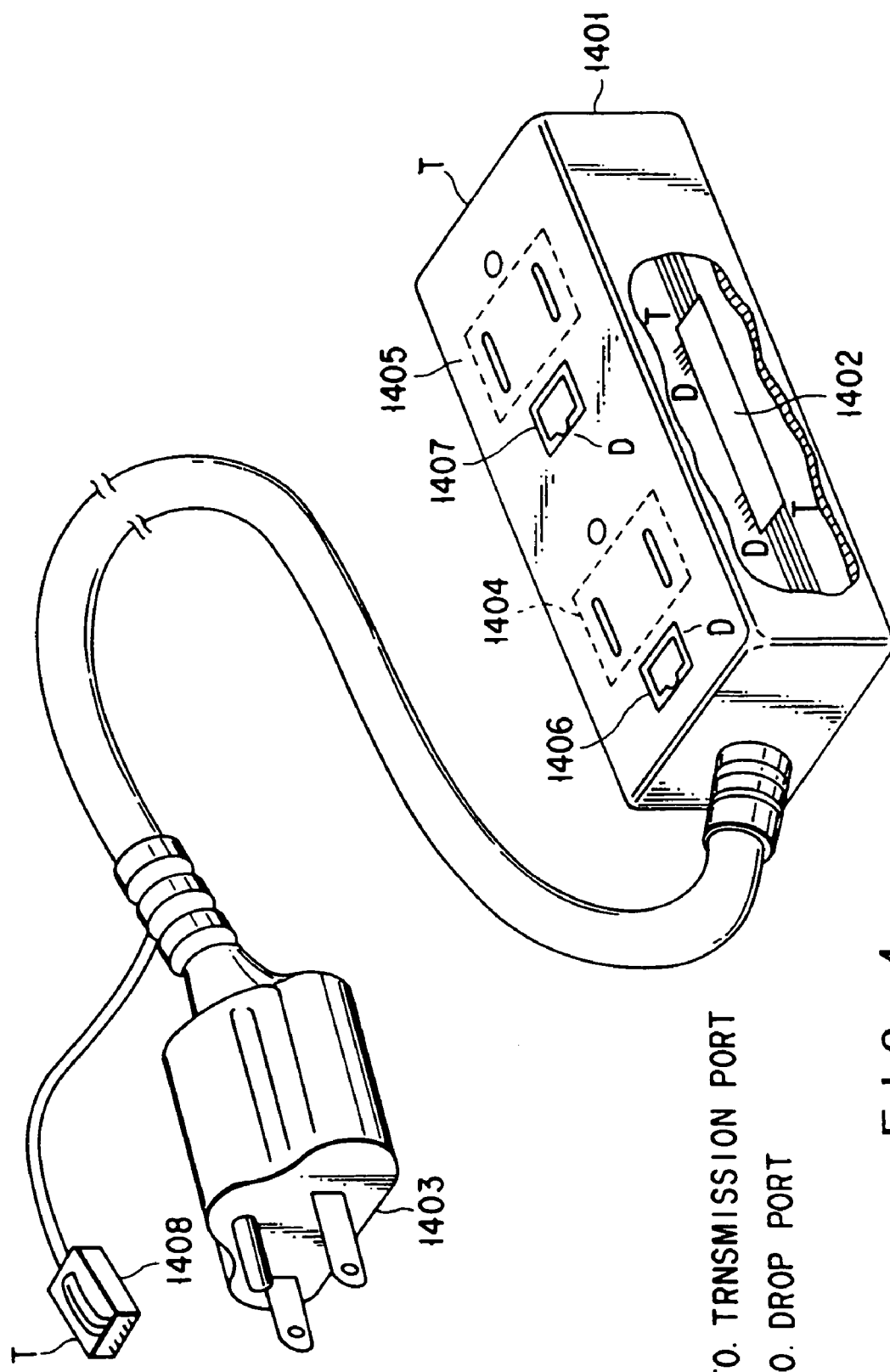
T: INFO. TRNSMISSION PORT
D: INFO. DROP PORT
F I G. 4

T: INFO. TRANSMISSON PORT
D: INFO. DROP PORT

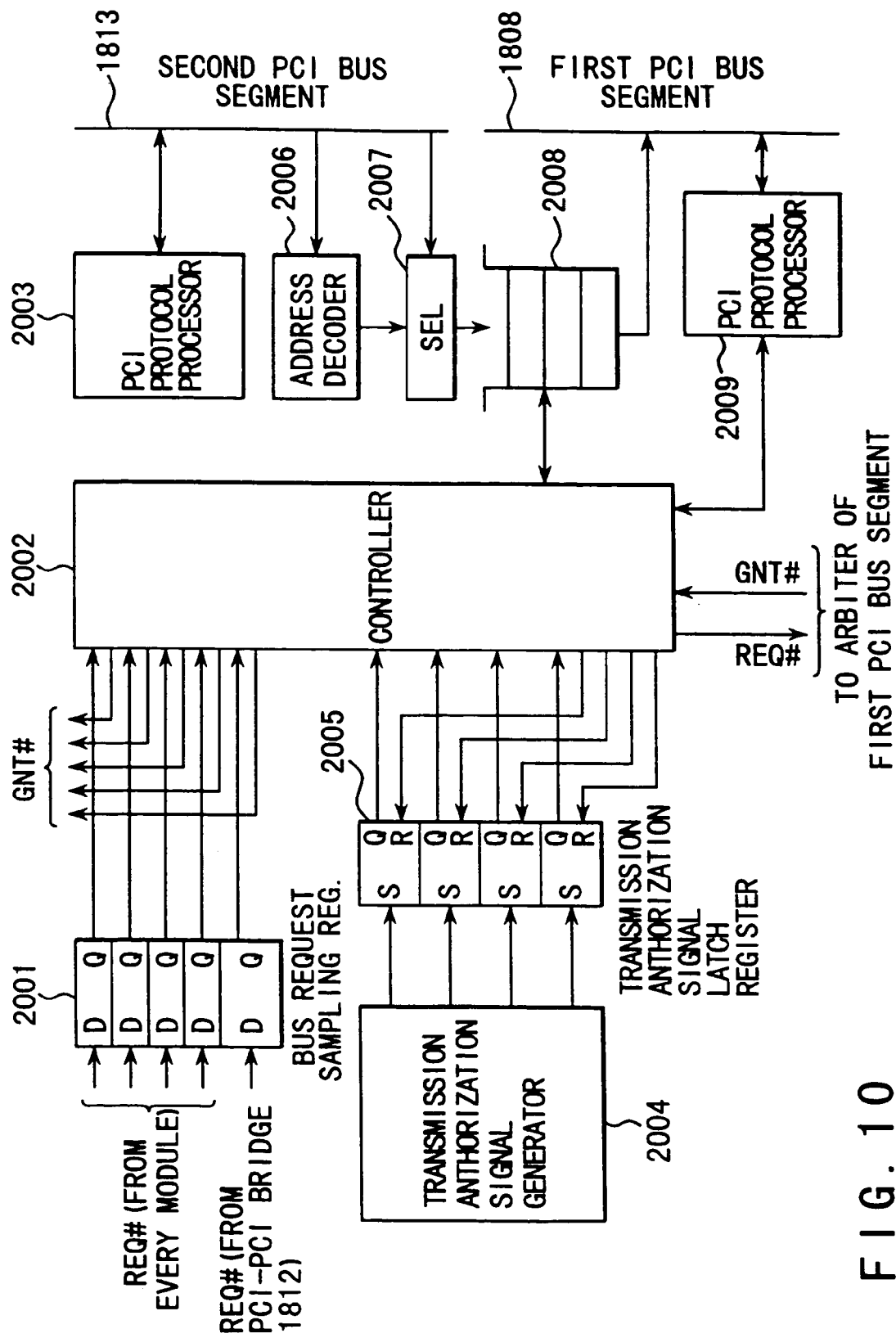
F I G. 10

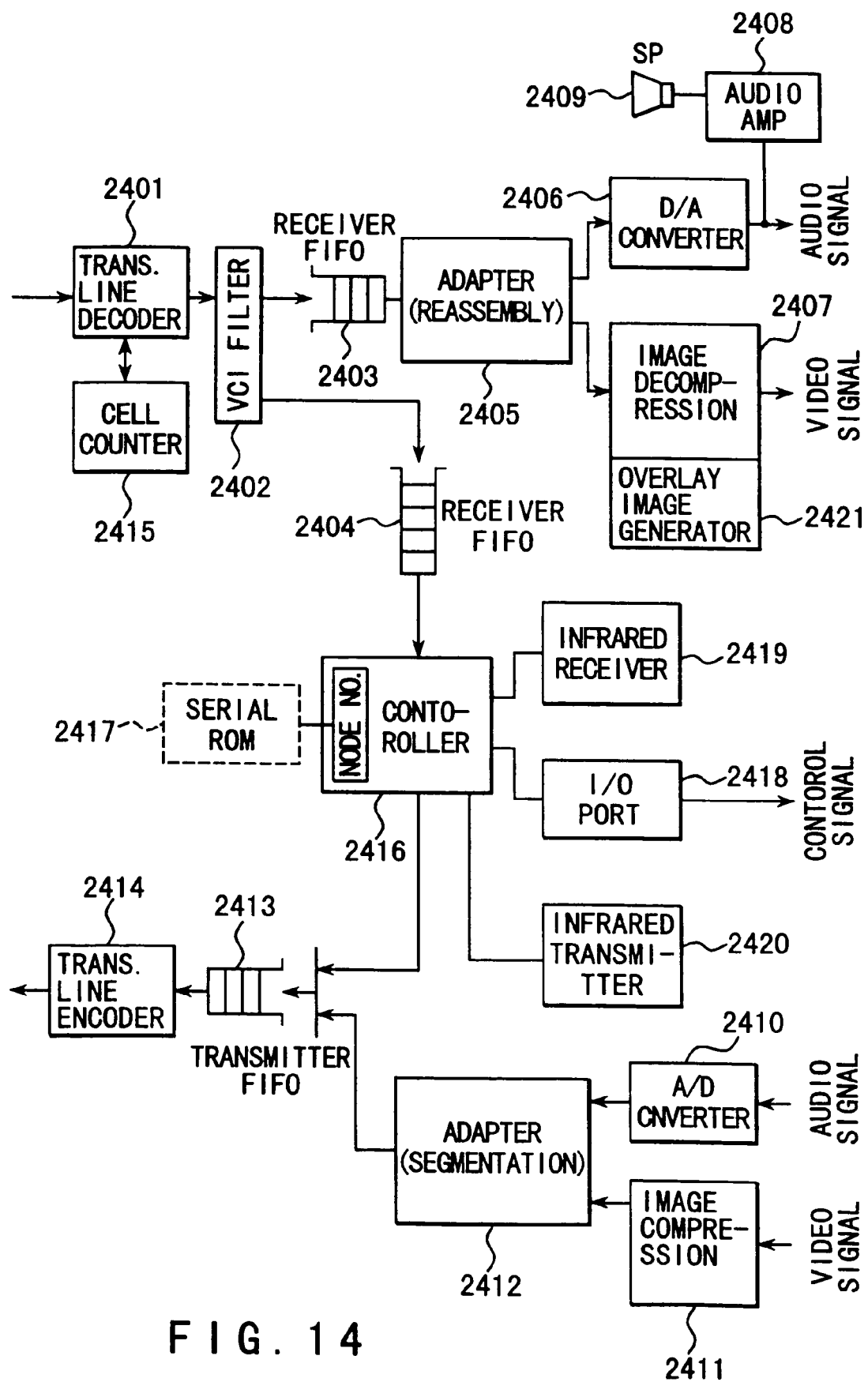
F I G. 14

ATM COMMUNICATION SYSTEM AND ATM COMMUNICATION METHOD

CROSS-REFERENCE TO RELATED APPLICATIONS

The present application is a continuation of U.S. application Ser. No. 09/703,790 filed on Nov. 2, 2000, now abandoned which is a divisional of U.S. application Ser. No. 08/870,425 filed on May 28, 1997, now U.S. Pat. No. 6,157,645 the entire contents each of which are hereby incorporated herein by reference, and in turn claims priority to JP 8-133090 filed on May 28, 1996.

BACKGROUND OF THE INVENTION

The present invention relates to an ATM (Asynchronous Transmission Mode) communication system and, more particularly, to an ATM communication system designed to be used in a private area.

In recent years, ATM techniques have been vigorously studied and developed to realize a B-ISDN. As for public networks, public network ATM switching units and ATM cross-connections have been vigorously developed. The carriers in various countries have gradually been constructing ATM networks by using such ATM switching units and ATM cross-connections. The ATM communication techniques have been applied to the business field as well; many benders are selling simple ATM switching units called ATM switches and constructing private networks.

ATM is a transmission scheme characterized in that digital information is transmitted by using a cell which is a short packet having a fixed length. By using short fixed-length packets, each terminal transmits cells as needed. Since each terminal can use the transmission capacity of a physical link relatively freely, ATM is suited to multi-rate communication. In addition, ATM can be used for speech communication or the like in which a delay time exerts a great influence on the communication quality. Furthermore, ATM allows high-speed processing because fixed-length cells are exchanged. Owing to these characteristics, ATM switching units for public and private networks have come into widespread use.

If public and private networks to which ATM communication is applied are widely used, for example, high-speed LAN connection between offices can be realized. A multimedia terminal may be installed in a store in a remote place. In this case, designs for clothes are presented to customers who visit the store, and the clothes ordered by the customers are tailored, thus proving convenient services. As users enjoy the benefits of ATM communication in business and privately, the users want to install multimedia terminals and LANs (Local Area networks) in their homes.

As described above, with the use of ATM, real-time multi-rate communication can be provided, and various types of existing/novel information sources/information services can be properly handled. If, therefore, ATM communication techniques are used, communication between the apparatuses and the information sources in homes can be realized. However, conventional ATM communication apparatuses have been applied to public networks or private networks in the business field and designed to have throughputs/functions/reliability high enough to properly cope with these fields. For this reason, these apparatuses are expensive. In addition, since the conventional ATM communication apparatuses are designed on the assumption that they are maintained and operated by experts, they require complicated operations. For this reason, the conventional ATM communication apparatuses are not suitable for home use without any modification.

As a communication apparatus construction technique for realizing multimedia communication in homes, a standard called P1394 has been proposed by IEEE (The Institute of Electrical and Electronics Engineers). This standard has been established mainly for a communication path between a personal computer and an external storage unit. Recently, however, a packet/line switching function is added to this standard to handle continuous system information. With the addition of this function, for example, the number of messages assigned to one frame must be dynamically changed to transmit MPEG2 messages. The implementation of this function, therefore, becomes increasingly complicated as the transmission rates of information from information sources vary. That is, P1394 cannot cope with various types of existing/novel information sources/information services at a low cost.

As described above, since the conventional ATM communication apparatuses are expensive and require complicated operations, they are not suitable for home use. In addition, the conventional communication apparatuses desired for home use cannot cope with various types of existing/novel information sources/information services in the future.

BRIEF SUMMARY OF THE INVENTION

It is an object of the present invention to provide an ATM communication system which is inexpensive enough to be introduced into a home, easy to operate, and capable of flexibly coping with future information sources/services, and an ATM communication method.

According to the first feature of the ATM communication system of the present invention, a port tag adding section (input port number adding section) adds port tags (input port numbers) for identifying the connection ports of information apparatuses as cell sources to ATM cells output therefrom, and the ATM cells are inserted into first and second cell flows. Thereafter, the ATM cells are broadcast to the entire ATM communication network. In receiving ATM cells, a cell drop section (port number filter) extracts the ATM cells from the first and second cell flows by referring to the port tags (input port numbers) added to the ATM cells by the port tag adding section (input port number adding section), and drops the cells to connection ports. With this operation, ATM cells can be transmitted without rewriting the headers of the ATM cells. Therefore, an information distribution route required to transmit ATM cells can be formed with a simple arrangement, and an inexpensive ATM communication network can be easily constructed.

In performing network synchronization for an ATM network, a cell counter counts the number of cells in one (first cell flow) of two cell flows, and a cell flow generating section (empty cell detector, inserting FIFO) generates a cell flow by inserting ATM cells to which port tags (input port numbers) are added and empty cells into the first and second cell flows in synchronism with a cell slot period estimated on the basis of the count value, thereby easily performing network synchronization for the ATM communication network without using expensive analog components such as a PLL. An inexpensive ATM network can therefore be constructed.

According to the second feature of the present invention, an information distribution route required to transmit ATM cells can be easily formed by simply cascading communication units through communication unit connection ports. Each communication unit comprises a port tag adding section (input port number adding section) for adding port tags (input port numbers) for identifying information apparatus connection ports (information drop ports A and B) to ATM cells respectively received therefrom, a cell counter for counting the number of cells in a first cell flow received from a first communication unit connection port (information transmission port A), a cell inserting section (empty cell detector, inserting FIFO) for inserting ATM cells to which port tags are added and empty cells into the first and second cell flows in synchronism with a cell slot period estimated on the basis of the number of cells counted by the cell counter, and a cell drop section (port number filter) for extracting ATM cells from the first and second cell flows on the basis of the port tags added to the ATM cells, and dropping the ATM cells to the plurality of connection ports.

In addition, the communication unit includes a power receiving section for receiving power from another communication unit connected to the first communication unit port (information transmission port A), and a power distributing section for distributing the power received by the power receiving section to the information apparatuses connected to the information apparatus connection ports (information drop ports A and B) and still another communication unit connected to a second communication unit connection port (information transmission port B). With this arrangement, both an information distribution route required to transmit ATM cells and a power distribution route can be formed by simply cascading a plurality of communication units through communication unit connection ports, and connecting a plurality of information apparatuses through a plurality of information apparatus connection ports.

An ATM transmission/reception unit (information box) for generating a first cell flow may be arranged on the most upstream side of the first cell flow. With this arrangement, if, for example, the ATM transmission/reception unit includes an interface function for an external network, communication can be performed in synchronism with the external network.

More specifically, the ATM transmission/reception unit includes a first cell generating section (output interval generator) for generating a first cell flow by inserting ATM cells into cell slots on the basis of a predetermined band.

According to the above communication unit, the cell counter counts the number of cells in the first cell flow generated by the ATM cell transmission/reception unit (information box), and the cell inserting section (empty cell detector, inserting FIFO) inserts ATM cells to which the port tags are added and empty cells into the first and second cell flows in synchronism with a cell slot period estimated on the basis of the number of cells counted by the cell counter, thereby easily establishing network synchronization.

According to the third feature of the present invention, when an ATM cell transmission route is constructed by a plurality of buses which are hierarchically connected to each other, and an ATM cell is to be transmitted from a first device (module) designed to transmit/receive ATM cells and connected to one of the plurality of buses, a message generating section (receiving cell buffer, selector) generates an ATM cell transmission message by inserting the ATM cell into a message in the format depending on the bus. An address output section (address generator, selector) then outputs an address for designating a device as the destination of this ATM cell transmission message by using a bus identifier for identifying one of the buses and a device identifier for identifying one of the devices connected to the buses. A message transmitting section (PCI protocol processor, selector) writes the ATM cell transmission message in the device designated by the address output from the address output section. Therefore, an ATM communication system having a simple arrangement using an existing system such as a PCI bus system can be constructed.

Assume that all the first devices for transmitting/receiving ATM cells and the arbiter are connected to one of the buses, and the arbiter receives bus request signals output from one of the first devices (modules) and the bridge circuit and is to give authorization to use the bus to one of them. In this case, the arbiter gives authorization to use the bus to the first device in preference to the bridge circuit. According to the present invention, therefore, an ATM communication system (ATM switch) having a simple arrangement using, for example, a PCI bus can be constructed. In addition, ATM communication can be performed, with the QOS (quality of service) being guaranteed by priority control of the arbiter.

In the arbiter, when a bus request sampling register receives a bus request signal output from the first device, a transmission authorization signal generator, a transmission authorization signal latch register, and a controller give authorization to use the bus to the first device on the basis of the ATM cell transmission interval calculated on the basis of the band assigned to the ATM cell transmission/reception device in advance. That is, the arbiter gives authorization to use the bus to the first device in accordance with the band assigned to the first device in advance, thereby realizing ATM communication with the QOS being guaranteed.

More specifically, upon reception of bus request signals from the first devices, the arbiter gives authorization to use the bus to the respective first devices in accordance with the ATM cell transmission time based on the ATM cell transmission interval calculated on the basis of the bands respectively assigned to the first devices.

According to an ATM communication method of the present invention, index information (associated with processes which can be executed by the respective information apparatuses, and with information data held therein) which are stored in each information apparatus in a private area is acquired. The acquired index information is presented. When given information data and a given process are linked with each other on the basis of the presented index information, the information data is transmitted using an ATM cell to the information apparatus which executes the process linked with the information data. That is, ATM cell transmission can be performed by a simple operation of linking the information data stored in each information apparatus with the process functions in each information apparatus (an operation which is easy for the user to understand intuitively, e.g., clicking on icons with a mouse). Therefore, for example, an environment suited to the home network can be provided for the user. In addition, when a new information apparatus is to be connected to the ATM communication system of the present invention, the system automatically acquires index information stored in the new information apparatus. Therefore, the user can quickly use the new information apparatus by simply connecting it to the system without performing cumbersome setting. That is, new information sources, services, and functions can be flexibly and easily added to the ATM communication system of the present invention.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a perspective view showing an example of an information apparatus incorporating the components of the information drop section in FIGS. 3A and 3B;

FIG. 10 is a block diagram showing an example of the arrangement of an arbiter for the second PCI bus segment of the information box in FIG. 8;

FIG. 14 is a block diagram showing an example of the arrangement of an NTSC encoder decoder connected to the home network in FIGS. 1A to 2;

DETAILED DESCRIPTION OF THE INVENTION

An embodiment of the present invention will be described below with reference to the accompanying drawings.

1. Overall Arrangement of Private Area Network

Figure 1A:
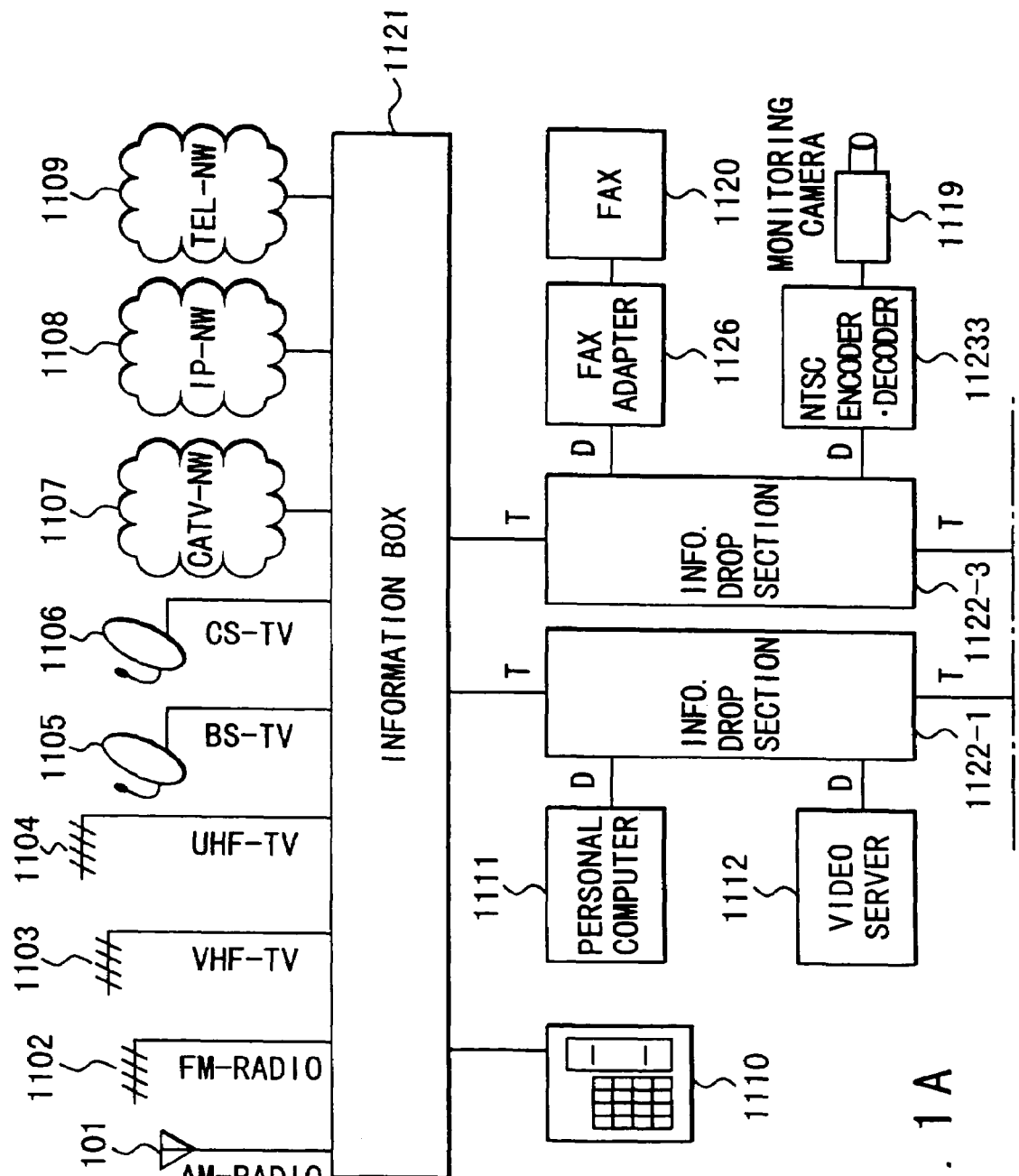
FIGS. 1A and 1B are block diagrams showing an example of the arrangement of a home network as a private area network to which an ATM communication system according an embodiment of the present invention is applied.
Figure 1B:
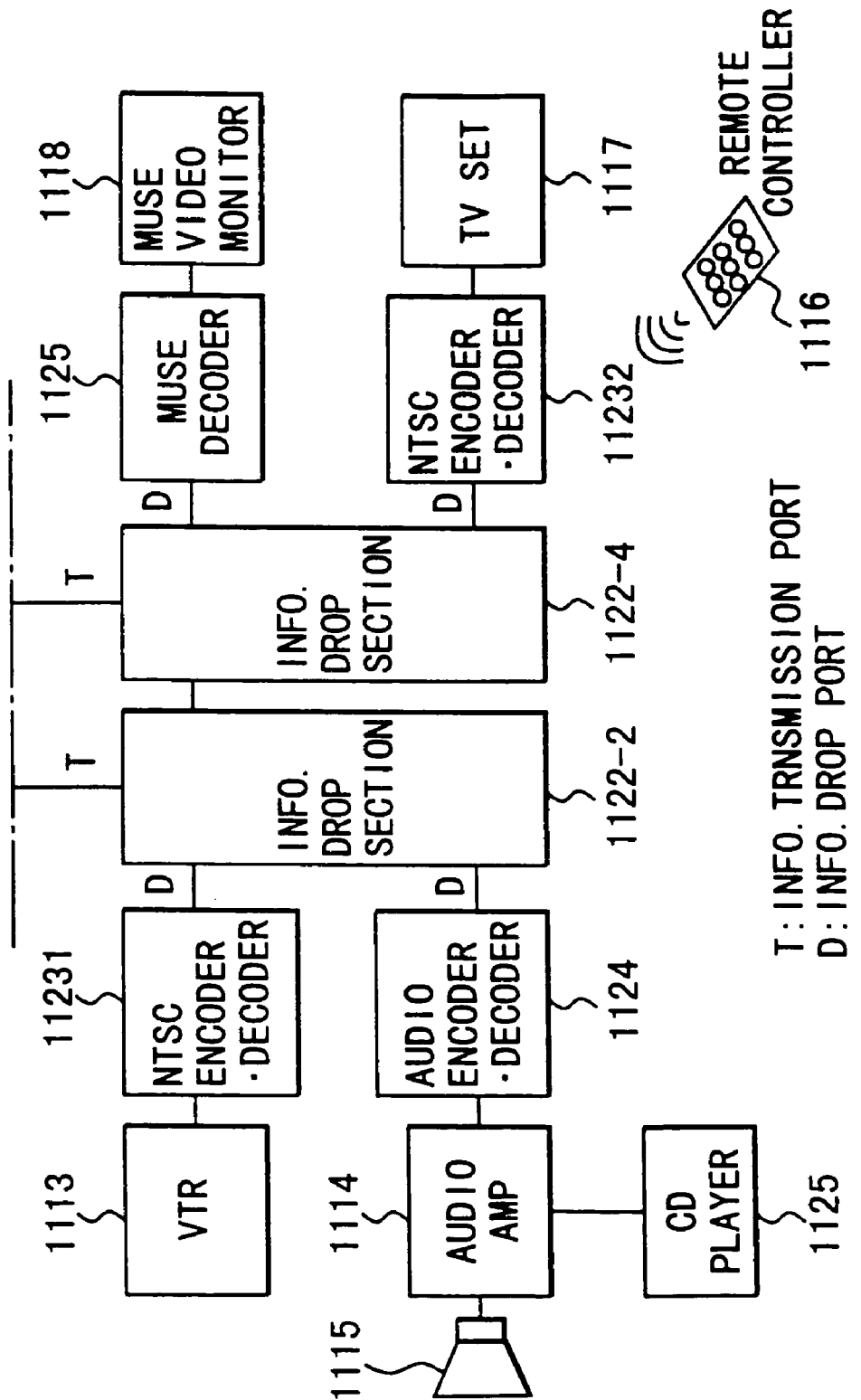

FIGS. 1A and 1B show a private area network to which the ATM communication system of the present invention is applied, and more specifically, an example of the overall arrangement of a private area network constructed in a home (to be referred to as a home network hereinafter). Home networks provide inexpensive real-time multi-rate communication services for information sources and home audio•visual•information apparatuses (to be abbreviated as AVI apparatuses hereinafter) which have or will come into widespread use in homes. Referring to FIGS. 1A and 1B, an information box 1121 and a plurality of (e.g., four in FIGS. 1A and 1B) information drop sections 1122-$i$ (1122-1, 1122-2, ..., 1122-4) constitute the ATM communication system of the present invention.

Referring to FIGS. 1A and 1B, as radio system services using ground/satellite waves and provided for homes, AM/FM radio, VHF/UHF television, and BS/CS television services are assumed. Antennas such as an AM radio antenna 1101, an FM radio antenna 1102, a VHF-TV antenna 1103, a UHF-TV antenna 1104, a BS-TV antenna 1105, and a CS-TV antenna 1106 are therefore connected to the information box 1121. In addition, referring to FIGS. 1A and 1B, as wire system services provided for the home, telephone, CATV, and IP network services are assumed, so that a CATV network (CATV-NW) 1107, An IP network (IP-NW) 1108, and a telephone network (TEL-NW) 1109 are therefore connected to the information box 1121. The information box 1121 converts pieces of information from these information sources into pieces of digital information by the method to be described later, and transmits the pieces of information to the information drop sections 1122-$i$ to supply them to the apparatuses selected by the user in the home.

Referring to FIGS. 1A and 1B, as AVI apparatuses to be connected to the home network according to the present invention, a telephone 1110, a personal computer 1111, a VTR 1113, an audio amplifier 1114, a TV set 1117, a monitoring camera 1119, an audio amplifier 1114, a TV set 1117, a monitoring camera 1119, and a FAX 1120 are assumed. These apparatuses except for the telephone 1110 are connected to the information box 1121 through the information drop sections 1122-$i$. As AVI apparatuses expected to become widespread in the near future, a video server 1112 and an HDVT video monitor 1118 are also connected to the information box 1121 through the information drop sections 1122-$i$. Note that a speaker 1115 and a CD player 1125 are connected to the audio amplifier 1114.

In general, analog information is used for apparatus connection for existing AVI apparatuses such as the VTR 1113, the audio amplifier 1114, the TV set 1117, the monitoring camera 1119, and the FAX 1120, and hence analog/digital conversion is required to connect them to the information drop sections 1122-$i$. For this reason, the communication system according to the present invention includes NTSC encoders•decoders 11231, 11232, and 11233, an audio encoder•decoder 1124, a FAX adapter 1126, and the like. Referring to FIGS. 1A and 1B, the NTSC encoder•decoder 11231 is installed between the VTR 1113 and the information drop section 1122-2; the audio encoder•decoder 1124, between the VTR 1113 and the information drop section 1122-2; the NTSC encoder•decoder 11232, between the TV set 1117 and the information drop section 1122-4; the NTSC encoder•decoder 11233, between the monitoring camera 1119 and the information drop section 1122-3; and the FAX adapter 1126, between the FAX 1120 and the information drop section 1122-3. With this arrangement, analog/digital conversion is performed.

A remote controller 1116 is used to control most of the existing AVI apparatuses. In the present invention, the remote controller 1116 is used to control communication between each information source and a corresponding AVI apparatus. In order to realize this control, the NTSC encoders•decoders 11231, 11232, and 11233 and the audio encoder•decoder 1124 may have a function of receiving infrared rays emitted from the remote controller.

On the telephone network 1109, in consideration of the necessity for urgent communication, the telephone 1110 is directly connected to the information box 1121 to be able to operate even if power fails in the user's home.

ATM cells are used for digital data communication between the information box 1121 and the information drop sections 1122-i, and a real-time multi-rate communication service, which is a known ATM feature, is provided for various AVI apparatuses. According to a feature of the information box and the information drop sections, they provide communication on a broadcast basis instead of providing communication on a switching basis which is the dominating technique in the conventional ATM communication apparatuses. With this technique, inexpensive, high-speed information transmission paths can be provided between the AVI apparatuses, and at the same time, point-multipoint connection can be easily realized. In addition, as long as the information box 1121, the information drop sections 1122-i, and the respective apparatuses constitute a tree structure, the information drop sections 1122-i can be arbitrarily coupled. For example, each of the information drop sections 1122-i in FIGS. 1A and 1B has two data input/output terminals T called information transmission ports and two data input/output ports D called information drop ports. The information transmission ports are used to connect the information drop sections 1122-i to the information box 1121 and the information drop sections 1122-i to each other. The information drop ports are mainly used to connect the information drop sections 1122-i to the AVI apparatuses. The function of each of these data input/output terminals will be described in detail later.

Figure 2:
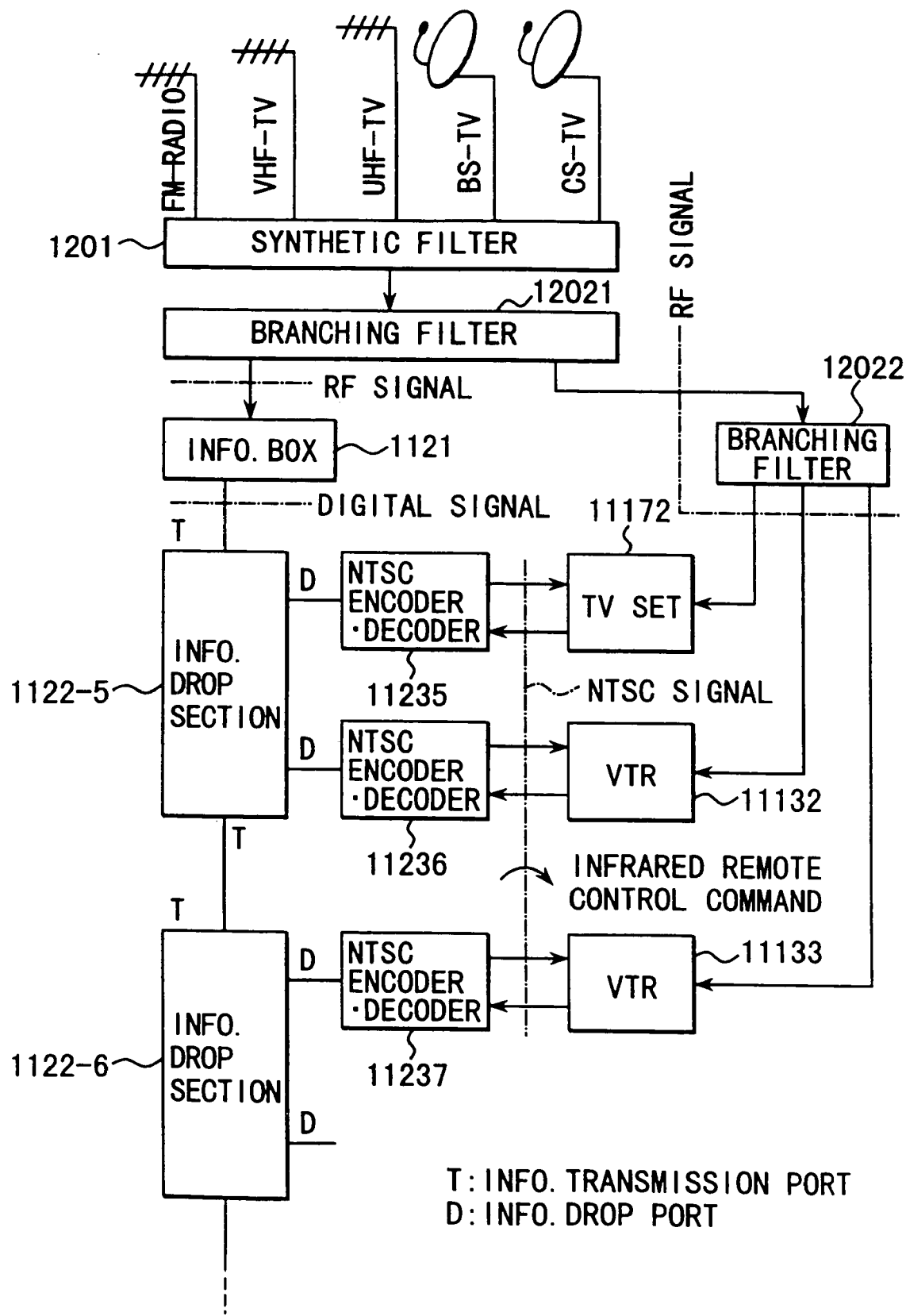
FIG. 2 is block diagram showing another example of the arrangement of a home network as a private area network to which the ATM communication system according to the embodiment of the present invention is applied.

FIG. 2 shows another arrangement of the home network. The arrangement of the home network in FIG. 2 differs from that in FIGS. 1A and 1B in the following point. The home network in FIGS. 1A and 1B does not use the coaxial cables which have been strung around the home to guide ground/satellite waves as RF signals to the respective rooms of the home. In contrast to this, the home network in FIG. 2 uses the coaxial cables for an existing TV set 11172 and existing VTRs 11132 and 11133 to supply RF signals into the home. RF signals transmitted from information sources and received by the corresponding antennas are synthesized by a synthetic filter 1201 first, and then guided to a branching filter 12021. The branching filter 12021 guides the synthetic RF signal to an information box 1211, and also guides it to a branching filter 12022 which causes the RF signal to the TV set 11172 and the VTRs 11132 and 11133. The branching filter 12022 guides this RF signal to the TV set 11172 and the VTRs 11132 and 11133. A digital signal from the information box 1121 is guided as an NTSC signal to the TV set 11172 and the VTRs 11132 and 11133 through information drop sections 1122-5 and 1122-6 and NTSC encoders•decoders 11235, 11236, and 11237, as in the arrangement shown in FIGS. 1A and 1B. If the coaxial cables are used to guide RF signals to the existing AVI apparatuses in this manner, the number of tuners to be incorporated in the information box 1121 can be decreased, and the information box 1121 can be realized at a low cost. In addition, if NTSC signals sent from the TV set 11172 and the VTRs 11132 and 11133 are converted into digital signals by the NTSC encoders•decoders 11235 to 11237 and supplied to the home network, the user in the bed room can enjoy the same movie as the one seen in the living room, realizing a preferable embodiment. Furthermore, the synthetic filter 1201 and the branching filters 12021 and 12022 may be designed such that an RF signal is transmitted from one of the NTSC encoders•decoders 11235 to 11237 which has an available channel, and digital data are transmitted to the remaining NTSC encoders•decoders. In this case, coaxial cables are used between the NTSC encoders•decoders 11235 to 11237 and the branching filter 12022, as well as between the TV set 11172 and the VTRs 11132 and 11133.

It is preferable that AVI apparatuses installed in remove places be remotely controlled. For example, it is preferable that the user in the bed room remotely control a VTR installed in the living room. In the home network to which the present invention is applied, in order to remotely control the conventional AVI apparatuses, each of the NTSC encoders•decoders 11235 to 11237 has a function of transmitting infrared remote control commands. The NTSC encoders•decoders 11235 to 11237 transmit infrared signals which can be interpreted by the AVI apparatuses connected thereto, thus allowing control of the AVI apparatuses from the network side.

2. Arrangements and Operations of Information Apparatuses Constituting Private Area Network The arrangements and operations of the information apparatuses constituting the networks shown in, for example, FIGS. 1A and 1B and 2 will be described in detail next.

2.1 Information Drop Section

Figure 3A:
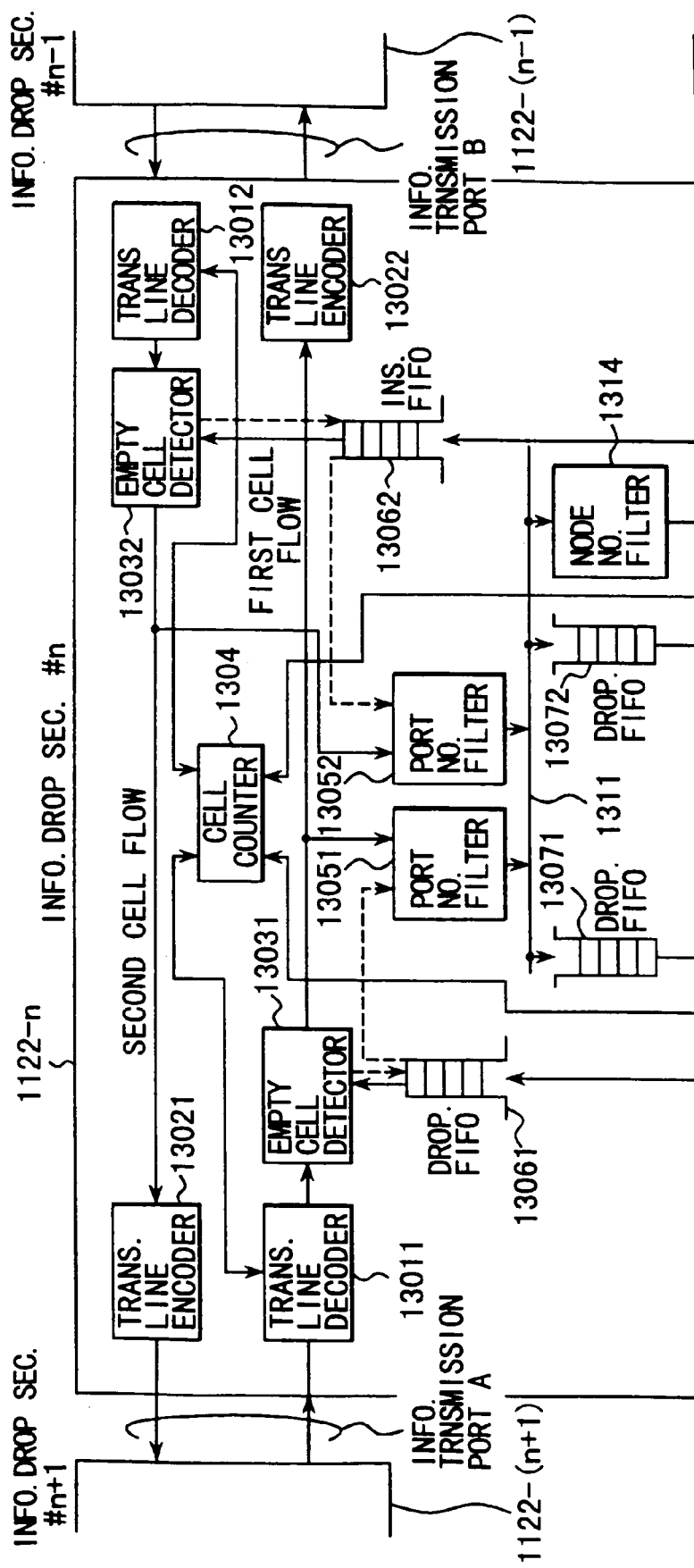
FIGS. 3A and 3B are block diagrams showing an example of an information drop section according to the embodiment of the present invention.
Figure 3B:
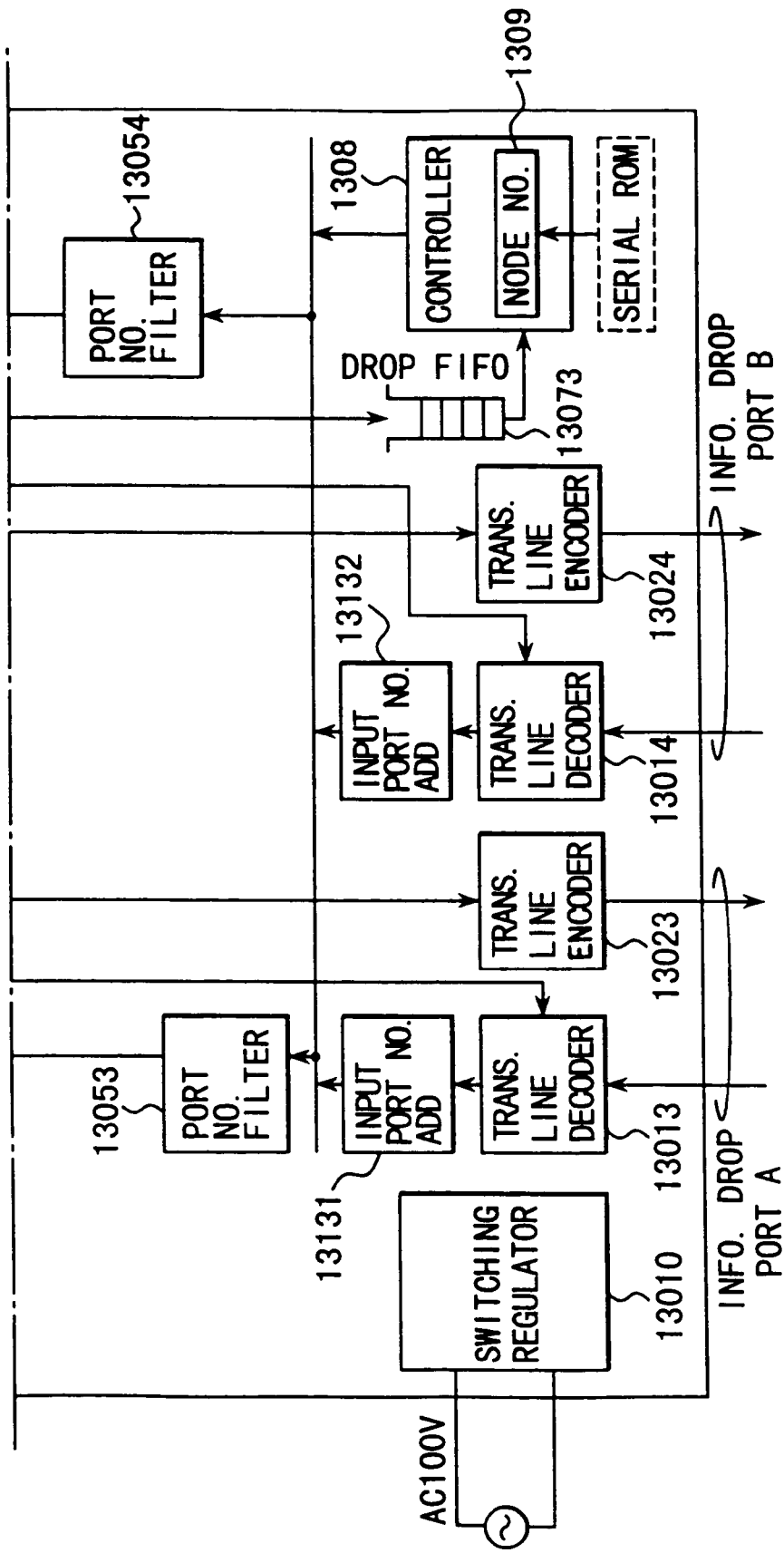

FIGS. 3A and 3B show the detailed hardware arrangement of the information drop section 1122-i (i=1 to 7) in FIGS. 1A to 2.

2.1.1 Arrangement and Operation of Information Drop Section

The information drop section 1122-i provides communication lines using ATM cells on a broadcast basis between AVI apparatuses. The information drop section 1122-i performs so-called drop/insert processing to realize broadcasting, with the main purpose of reducing the hardware amount. Since broadcasting is realized by drop/insert processing, the operating speed of each FIFO or the number of FIFOs can be decreased. The hardware amount can therefore be reduced.

The two information transmission ports T of the information drop section 1122-i serve as input/output terminals for cascade connection of the respective information drop sections 1122-i. FIGS. 3A and 3B show a state in which the (n−1)th information drop section 1122-(n−1), the nth information drop section 1122-n, and the (n+1)th information drop section 1122-(n+1) are cascaded to each other. The information transmission ports A of the nth information drop section 1122-n are connected to the (n+1)th information drop section 1122-(n+1). The information transmission ports B of the nth information drop section 1122-n are connected to the (n−1)th information drop section 1122-(n−1).

The operation of each information drop section 1122-i will be briefly described below. All cells (valid cells), other than empty cells, input through some information transmission ports of each information drop section 1122-i are output from the remaining information transmission ports thereof. Referring to FIGS. 3A and 3B, all the valid cells input through the information transmission ports A of the information drop section 1122-n are output from the information transmission ports B thereof, whereas all the valid cells input through the information transmission ports B are output from the information transmission ports A. The valid cells in two cell flows which flow between the information transmission ports A and B are copied and sent to the respective information drop ports. Valid cells input from the information drop ports replace empty cells detected from the cell flows which flow between the information transmission ports and are output from the information transmission ports A and B.

Referring to FIGS. 3A and 3B, transmission line decoders 13011, 13012, 13013, and 13014 are connected to the input terminals of the information transmission ports A and B and those of the information drop ports A and B. Transmission line encoders 13021, 13022, 13023, and 13024 are connected to the output terminals of these ports. With this arrangement, the signal forms on the transmission lines between the information drop sections 1122-$i$, between the information drop sections 1122-$i$ and the information box 1121, and between the information drop sections 1122-$i$ and the AVI apparatuses are converted into the signal form in the information drop sections 1122-$i$. In this case, the signal form in the information drop sections 1122-$i$ corresponds to a cell flow based on an electrical signal. The signal forms on the transmission lines are not specifically limited.

The transmission line decoders 13011 and 13012 reproduce cell flows from the bit strings input through the information transmission ports A and B in the signal form on the transmission lines. Referring to FIGS. 3A and 3B, the cell flow input through the information transmission port A and reproduced by the transmission line decoder 13011 is referred to as the first cell flow, whereas the cell flow input through the information transmission port B and reproduced by the transmission line decoder 13012 is referred to as the second cell flow. The reproduced first and second cell flows are transmitted to the other transmission line encoders 13022 and 13021 through the empty cell detectors 13031 and 13032. The transmission line encoders 13022 and 13021 convert the received cell flows into the signal forms on the transmission lines, and send them to the transmission lines connected to the information transmission ports A and B. The empty cell detectors 13031 and 13032 insert the valid cells input from the two information transmission ports into the cell flows flowing between the two information transmission ports. The number of ATM cells received by the transmission line decoders 13011 and 13012 connected to the information transmission ports A and B and the transmission line decoders 13013 and 13014 connected to the information drop ports A and B is counted by a cell counter 1304. The first and second cell flows transmitted from the empty cell detectors 13031 and 13032 are transmitted to the transmission line encoders 13022 and 13021, and also transmitted to first and second port number filters 13051 and 13052, respectively. The first and second port number filters 13051 and 13052 extract all the valid cells from the received cell flows, and transmit the extracted valid cells to a first merging bus 1311. The first merging bus 1311 has an information transmission capacity corresponding to the sum of the information input speeds of the two information transmission ports A and B. The first merging bus 1311 merges the valid cells transmitted from the first and second port number filters 13051 and 13052, and send the resultant cells to first and second drop FIFOs 13071 and 13072 respectively provided for the information transmission ports A and B. The first and second drop FIFOs 13071 and 13072 temporarily hold the received valid cells, and transmit them to the transmission line encoders 13023 and 13024 connected to the information transmission ports A and B in accordance with the cell transmission rates at the information transmission ports A and B, respectively. If the first and second drop FIFOs 13071 and 13072 have no cells to be transmitted, they transmit empty cells to the transmission line encoders 13023 and 13024. The transmission line encoders 13023 and 13024 convert the received cell flows into the signal forms on the transmission lines, and transmit the resultant signals to the transmission lines connected to the information transmission ports A and B.

The bit strings input from AVI apparatuses to the information transmission ports A and B in the signal forms on the transmission lines are input to the transmission line decoders 13013 and 13014. The transmission line decoders 13013 and 13014 reproduce cell flows from the input bit strings. The reproduced cell flows are transmitted first to input port number adders 13131 and 13132. The input port number adders 13131 and 13132 add input port numbers to the respective cells depending on whether each cell is input from the information transmission port A or B, and transmit the resultant cells to a second merging bus 1312. The second merging bus 1312 has an information transmission capacity corresponding to the sum of the information input speeds of the two information transmission ports A and B. The second merging bus 1312 merges the cell flows transmitted from the transmission line decoders 13013 and 13014, and transmits the resultant cell flows to third and fourth port number filters 13053 and 13054 respectively provided for the first and second cell flows. The third and fourth port number filters 13053 and 13054 extract the valid cells from the transmitted cell flows, and transmit them to first and second insert FIFOs 13061 and 13062. The first and second insert FIFOs 13061 and 13062 temporarily hold the transmitted valid cells.

The first and second insert FIFOs 13061 and 13062 are respectively connected to the empty cell detectors 13031 and 13032. The first and second insert FIFOs 13061 and 13062 transmit the held valid cells to the empty cell detectors 13031 and 13032 in accordance with instructions therefrom. When the empty cell detectors 13031 and 13032 detect empty cells in the cell flows flowing therein, the detectors instruct the first and second insert FIFOs 13061 and 13062 to transmit valid cells.

Upon reception of the valid cells from the first and second insert FIFOs 13061 and 13062, the empty cell detectors 13031 and 13032 replace the detected empty cells with the received valid cells, and output them to the transmission line encoders 13022 and 13021 connected to the information transmission ports to which the empty cell detectors 13031 and 13032 are respectively connected. At this time, the first and second insert FIFOs 13061 and 13062 output the input port numbers added to the output cells to the corresponding first and second port number filters 13051 and 13052. The first and second port number filters 13051 and 13052 filter the cells output from the first and second insert FIFOs 13061 and 13062 on the basis of the port numbers output from the first and second insert FIFOs 13061 and 13062. In the arrangement shown in FIGS. 3A and 3B, the first insert FIFO 13061 sends cells to the first empty cell detector 13031 through which the first cell flow is passing, and the first port number filter 13051 separates the valid cells from the first cell flow. The first port number filter 13051 therefore corresponds to the first insert FIFO 13061. Similarly, the second port number filter 13052 corresponds to the second insert FIFO 13062. When the first and second port number filters 13051 and 13052 extract the valid cells from the corresponding cell flows, the filters output the input port numbers to the first merging bus 1311, together with the valid cells. The input port numbers transmitted from the first and second insert FIFOs 13061 and 13062 to the first and second port number filters 13051 and 13052 are used to insert cells into the first and second drop FIFOs 13071 and 13072 connected through the first merging bus 1311. That is, when the drop FIFOs 13071 and 13072 receive the valid cells to which the input port numbers are added, the drop FIFOs compare the port numbers of the information drop ports, to which the drop FIFOs are connected, with the input port numbers added to the valid cells. If the input port numbers coincide with each other, the corresponding valid cell is not loaded. With this operation, valid cells input from a given information drop port can be output from the other information drop port, and at the same time, the output from the information drop port from which the valid cells are input can be suppressed.

As described above, all the valid cells input to one information transmission port of the information drop section 1122-*i* are output to the other information transmission port, and at the same time, the valid cells from all the information drop ports are output to the information transmission ports A and B. As a result, the valid cells output from all the AVI apparatuses connected to the information box 1121 and the information drop sections 1122-*i* can be broadcastered to the entire home network.

It should be noted that in the information drop sections 1122-*i*, header conversion of input valid cells is not performed, unlike in public network/business ATM switching units. The information drop sections 1122-*i* therefore require no expensive functions such as a routing tag table, and can be implemented at a low cost. On the other hand, VPI/VCI data must be selected to be unique to the home. In addition, since no header conversion is performed by the information drop sections 1122-*i*, there is no need to prepare the function of updating the HEC (Header Error Control) field of a cell header. Note that the HEC check function for a reception cell is generally required because the head of a cell can be detected by an HEC check itself. However, the head of a cell can be detected from a transmission line code depending on the encoding scheme on the transmission line between the information drop sections 1122-*i*. In this case, the HEC check function is not required. Therefore, an HEC field is checked only at the destination terminal.

Each information drop section 1122-*i* incorporates a controller 1308. This controller is a computer system mainly constituted by a known inexpensive microprocessor such as Z80. The controller 1308 monitors/controls the operation of the information drop section 1122-*i*, and communicates with the information box 1121 and the other information drop sections 1122-*i* to allow the network to operate systematically as a whole. A node number 1309 as a global unique number is added to each controller 1308 when it is manufactured. With this node number 1309, the information drop section 1122-*i* and the information box 1121 are identified. The node number 1309 may be the node number in the ATM-LAN system disclosed in Jpn. Pat. Appln. KOKAI Publication No. 6-311180 filed by the present inventor. The node number 1309 may be recorded on a nonvolatile storage medium such as a serial ROM when the information drop section 1122-*i* is manufactured, and the controller 1308 may load this node number from the serial ROM when the system is started up. A network management method using this node number will be described in detail later.

An operation to be performed when the controller 1308 of the information drop section 1122-*i* communicates with the other information drop sections 1122-*i* and the information box 1121 will be described next. The controller 1308 itself transmits/receives ATM cells to communicate with the other information drop sections 1122-*i* and the information box 1121. For this purpose, the cells sent from the controller 1308 must be guided to the corresponding information transmission ports and the information drop ports, while the valid cells input from the information transmission ports and the information drop ports must be guided to the controller 1308.

According to the arrangement of the information drop section 1122-*i* in FIGS. 3A and 3B, a cell input/output operation for the controller 1308 is realized by the same method as the following method for the information drop ports A and B.

The input port numbers are added to the valid cells output from the controller 1308, similar to the valid cells output from the transmission line decoders 13013 and 13014. The resultant cells are output to the second merging bus 1312. Thereafter, similar to the valid cells output from the transmission line decoders 13013 and 13014, the cells merge with the first and second cell flows and are guided to the information transmission ports A and B and the information drop ports A and B through the third and fourth port number filters 13053 and 13054. The input port number adding operation will be described in detail later.

The valid cells input to the controller 1308 are valid cells appearing on the first merging bus 1311. The valid cells appearing on the first merging bus 1311 are temporarily held in a third drop FIFO 13073 through the node number filter 1314. The valid cells held in the third drop FIFO 13073 are loaded into the controller 1308 when, for example, the drop FIFO 13073 generates an interrupt. It should be noted that the controller 1308 is a computer system mainly constituted by a microprocessor having a relatively low operating speed such as Z80. Since the controller 1308 is a low-speed controller, all the valid cells on the first merging bus 1311 cannot be supplied to the controller 1308. If all the valid cells are supplied to the controller 1308, an overflow occurs. As a result, the controller 1308 cannot control the network. In order to prevent such a situation, the node number filter 1314 guides only the cells required by the controller 1308 to the third drop FIFO 13073.

The operation of the node number filter 1314 will be described in detail next. Assume that in the network of the present invention, monitoring control using broadcast cells in the ATM-LAN system disclosed in Jpn. Pat. Appln. KOKAI Publication No. 6-311180 filed by the present inventor is executed. A broadcast cell is a cell having predetermined VPI/VCI data. The controllers 1308 of the information drop sections 1122-*i* communicate with each other by using the predetermined VPI/VCI data, thereby monitoring/controlling the home network. According to Jpn. Pat. Appln. KOKAI Publication No. 6-311180, the above node number is added to this broadcast cell to indicate its destination and transmission source. The node number filter 1314 therefore refers to the destination field of the broadcast cell, and sends it to the third drop FIFO 13073 if the node number identical to that added to the self-node is written. In addition, according to Jpn. Pat. Appln. KOKAI Publication No. 6-311180, as the destination addresses of broadcast cells, "all terminal broadcasting" and "adjacent terminal drop" are defined for network configuration recognition. Assume that a received broadcast cell has such a special destination. In this case, in order to reduce the load on the controller 1308, the node number filter 1314 preferably refers to the transmission source field of the received broadcast cell not to enqueue the broadcast cells to the third drop FIFO 13073 if the same node number as that of the self-node is written on the cell. Note that as the VPI/VCI data predetermined for a broadcast cell, an arbitrary value may be selected, except for a value indicating an empty cell. For example, all the bits may be set to "1".

The function of an input port number will be described next. Each valid cell to which an input port number is added is sent to the second merging bus 1312 from the three types of functional sections, i.e., the information drop port A, the information drop port B, and the controller 1308. For this reason, each valid cell on the second merging bus 1312 must be identified; the specific functional section from which the valid cell is sent must be identified. In addition, the first and second port number filters 13051 and 13052 need to discriminate the valid cells input from the information transmission ports A and B from the valid cells sent from the information drop ports A and B and the controller 1308. It therefore suffices if a total of four types of states can be discriminated according to input port numbers. This discrimination can be realized by 2-bit information. For example, input port numbers can be encoded as follows:

input port number=(0, 0): cell from information transmission port;
input port number=(0, 1): cell from information drop port A;
input port number=(1, 0): cell from information drop port B; and
input port number=(1, 1): cell from controller 1308.

If input port numbers are encoded in this manner, the valid cells on the first merging bus 1311 from the first and second drop FIFOs 13071 and 13072 and the node number filter 1314 are loaded under the following conditions:

first drop FIFO 13071: cells having input port numbers other than input port number=(0, 1) are loaded;
second drop FIFO 13072: cells having input port number other than input port number=(1, 0) are loaded; and
node number filter 1314: cells having input port numbers other than input port number=(1, 1) are loaded.

A switching regulator 1310 uses an external AC voltage of 100 V to generate a voltage on which the information drop section 1122-$i$ operates. Note that the switching regulator 1310 is provided for each information drop section 1122-$i$ because of the implementation form of each information drop section to be described below.

2.1.2 Implementation Form of Information Drop Section

FIG. 4 shows the first implementation form of the information drop section 1122-$i$. According to this implementation form, an LSI 1402 obtained by integrating the functions of the information drop section 1122-$i$ described with reference to FIGS. 3A and 3B into one LSI chip is incorporated in a table tap 1401. An AC plug 1403 and sockets 1404 and 1405 of the table tap 1401 are arranged in correspondence with the information drop ports and the information transmission ports. Referring to FIG. 4, each information transmission port is indicated by "T", and each information drop port is indicated by "D".

One of the two information transmission ports T is assigned to an information plug 1408. The information plug 1408 for inputting/outputting information to/from the information transmission port T and the information plug 1408 are arranged as a pair. The information drop ports D are respectively assigned to the sockets 1404 and 1405. A connector 1406 for inputting/outputting information to/from the information drop port and the socket 1404 are arranged as a pair on the table tap 1401, so are a connector 1407 for inputting/outputting information to/from the information drop port and the socket 1405. The other information transmission ports T and the sockets formed in the surface of the table tap 1401 which is not shown in FIG. 4 are arranged in pairs, like the connectors 1406 and 1407.

The AC plug 1403 supplies power to the table tap 1401 to operate the internal information drop port, i.e., the LSI 1402, in the table tap 1401. When the AC plug 1403 is inserted into the socket to which the power is supplied, the information drop port, i.e., the LSI 1402, starts operating. At this time, the information transmission port corresponding to the information plug 1408 paired with the AC plug 1403 differs in state from the remaining information transmission ports and the information drop ports. In a control operation such as network synchronization to be described later, in which all the ports are required to operate uniformly in accordance with given information, the information transmission port T corresponding to the information plug 1408 plays a role different from those of the remaining ports.

Figure 5:
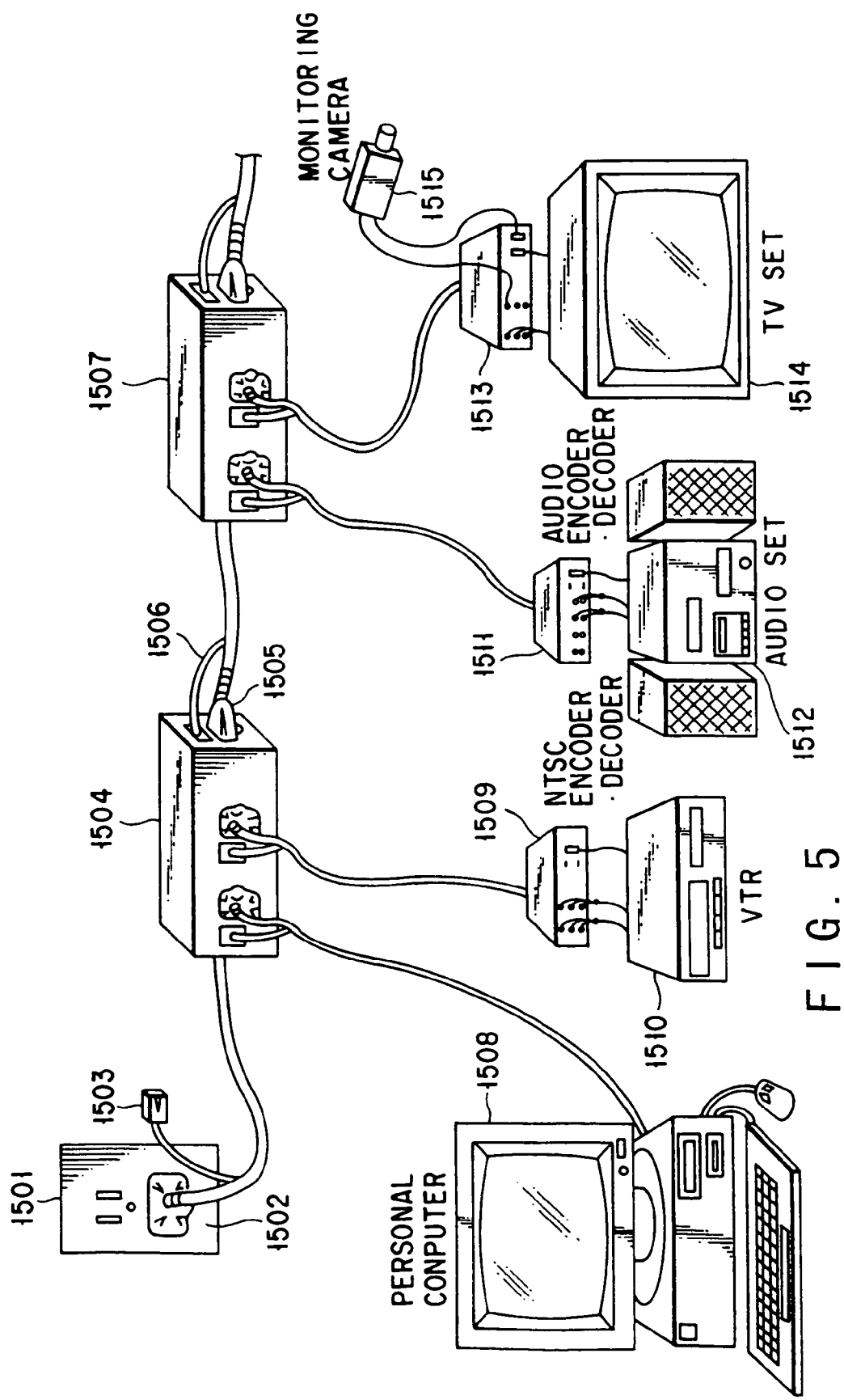
FIG. 5 is a perspective view showing a detailed example of a home network constructed by using the information apparatus (information drop section) in FIG. 4.

FIG. 5 shows a home communication system in which an information transmission route is formed for the home AVI apparatuses by using a plurality of table taps, each of which is similar to the one shown in FIG. 4, incorporated in the information drop sections 1122-$i$. FIG. 5 shows a state in which table taps 1504 and 1507 incorporated in the information drop sections provide an information transmission route for a personal computer 1508, a VTR 1510, an audio set 1512, a TV set 1514, and a monitoring camera 1515.

An AC plug 1505 of the table tap 1507 is inserted into the socket corresponding to an information transmission port T of the table tap 1504. An information plug 1506 of the table tap 1507 is also inserted into the connector corresponding to the socket corresponding to the information transmission port T of the table tap 1504. As a result, power is supplied to the AC plug 1505 through the table tap 1504, and the information drop section 1122-$i$ in the table tap 1507 starts operating. At the same time, the information drop section 1122-$i$ in the table tap 1504 can cooperate with the information drop section 1122-$i$ in the table tap 1507. An information transmission route is then provided for the respective AVI apparatuses. The information transmission route can be extended by inserting the AC plug and information plug of another table tap into the socket and connector which correspond to the information transmission port of the information drop section in the table tap 1507 in the above manner.

When the personal computer 1508 is connected to the table tap 1504, the computer can obtain power required for its operation, and at the same time, can access the information transmission route between the other AVI apparatuses. A unique expansion card for the execution of the embodiment of the present invention may be inserted into the personal computer 1508.

NTSC encoders•decoders 1509 and 1513 and an audio encoder•decoder 1511 are inserted/connected between the VTR 1510, the audio set 1512, the TV set 1514, the monitoring camera 1515, and the table taps 1504 and 1507, as needed. In this case, the encoders•decoders 1509, 1513, and 1511 belong to the same position as that of the expansion card inserted into the personal computer 1508. Note that these encoders•decoders have the function of conversion between digital signals in the form that allows communication through the information drop sections and analog signals which can be exchanged by the existing AVI apparatuses, as well as the function of the expansion card. As is apparent, power information cables which are unique to the present invention and have AC and information plugs extend from these encoders•decoders and are inserted in the sockets of the table taps 1504 and 1507.

It should be noted that an AC plug 1502 of the table tap 1504 is inserted into a wall outlet in a general home, but an information plug 1503 is not inserted into any outlet. As is apparent, an insulating/dust-proof cap is preferably put on such an information plug which is not used. The information plug 1503 is to be used to connect the information transmission route formed by the table taps 1504 and 1507 to an external network.

The form of connecting the information transmission route formed by the table taps 1504 and 1507 to an external network will be described next with reference to FIG. 6.

Figure 6:
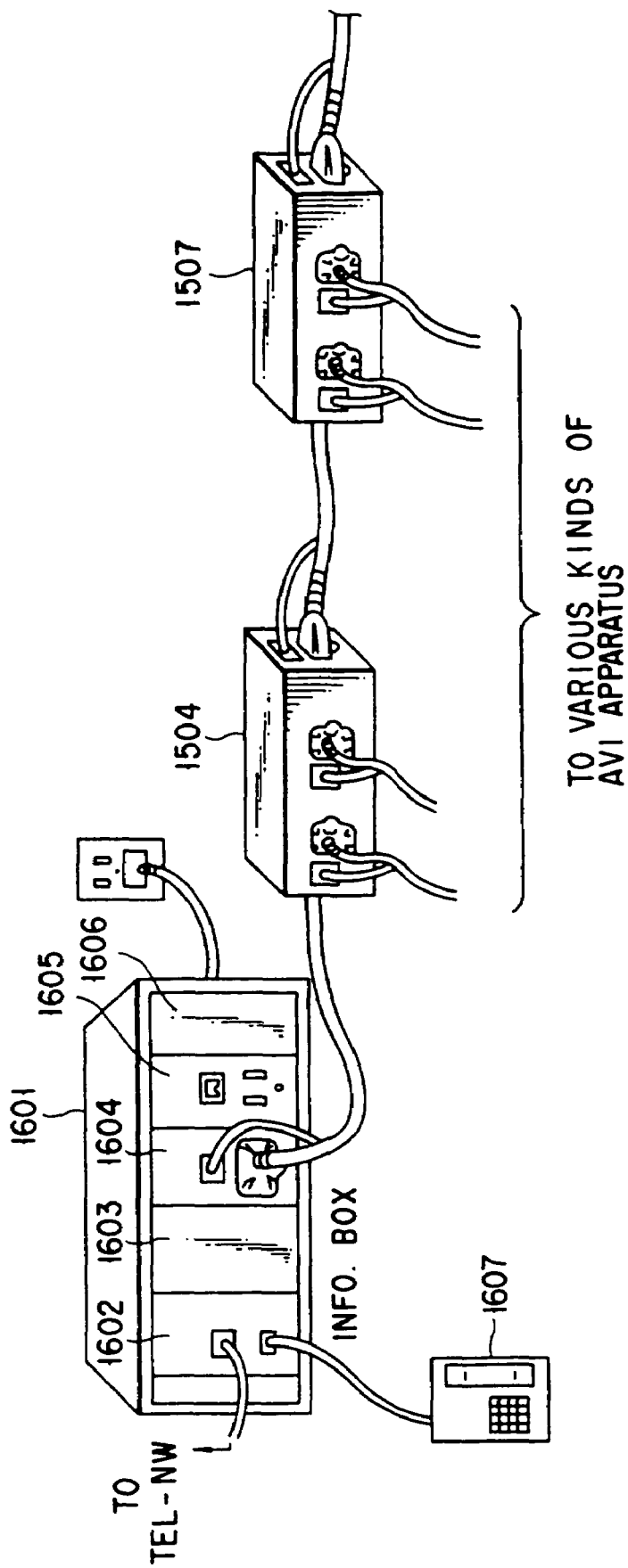
FIG. 6 is a perspective view showing another detailed example of the home network constructed by using the information apparatus (information drop section) in FIG. 4.

Referring to FIG. 6, the AG and information plugs of the table tap 1504 are connected to an information box 1601 designed to connect an external network to the information transmission route formed by the table taps 1504 and 1507. As a result, the information box 1601 supplies power required for the operations of the table taps 1504 and 1507, and the information drop sections 1122-$i$ incorporated in the table taps 1504 and 1507 operate in cooperation with the internal function of the information box 1601.

A plurality of modules 1602, 1603, 1604, and 1605 are inserted into the information box 1601. Each module has, for example, an interface function for a telephone network and a tuner function for ground/satellite waves. Since the information box 1601 is constituted by the plurality of modules, the user can determine the arrangement of the information box 1601 by selecting a desired information source/network/information service. As a result, the information box 1601 can be realized at a low cost. Note that the arrangements and operations of the information box and these modules will be described in detail later.

Figure 7:
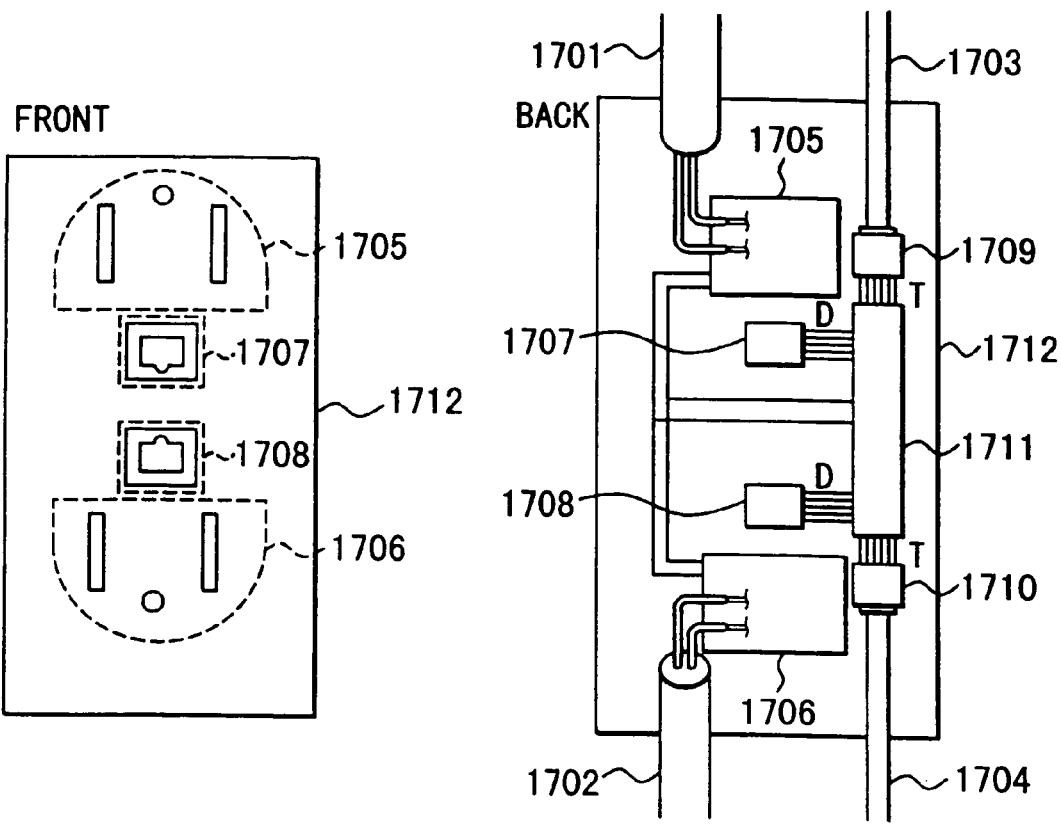
FIG. 7 is a view showing another example of the information apparatus incorporating the components of the information drop section in FIGS. 3A and 3B.

The implementation form of each information drop section is not limited to that incorporated in a table tap. For example, as shown in FIG. 7, an information drop section 1711 may be implemented on the rear surface side of a wall outlet 1712. In this implementation form, when power lines 1701 and 1702 of the wall outlet 1712 are installed, lines 1703 and 1704 of the information drop section 1711 can be installed at the same time. Similar to the table tap 1401 shown in FIG. 4, sockets 1705 and 1706 are arranged on the front surface of the wall outlet 1712 in FIG. 7, together with corresponding connectors 1707 and 1708 of the information drop ports of the information drop section 1711. Connectors 1709 and 1710 of the information transmission ports of the information drop section 1711 are arranged on the rear surface of the wall outlet 1712 and connected to the lines 1703 and 1704 embedded in the wall.

The power for operating the information drop section 1711 is supplied from the line which connects the power lines 1701 and 1702 on the wall outlet 1712.

2.2 Information Box

Figure 8:
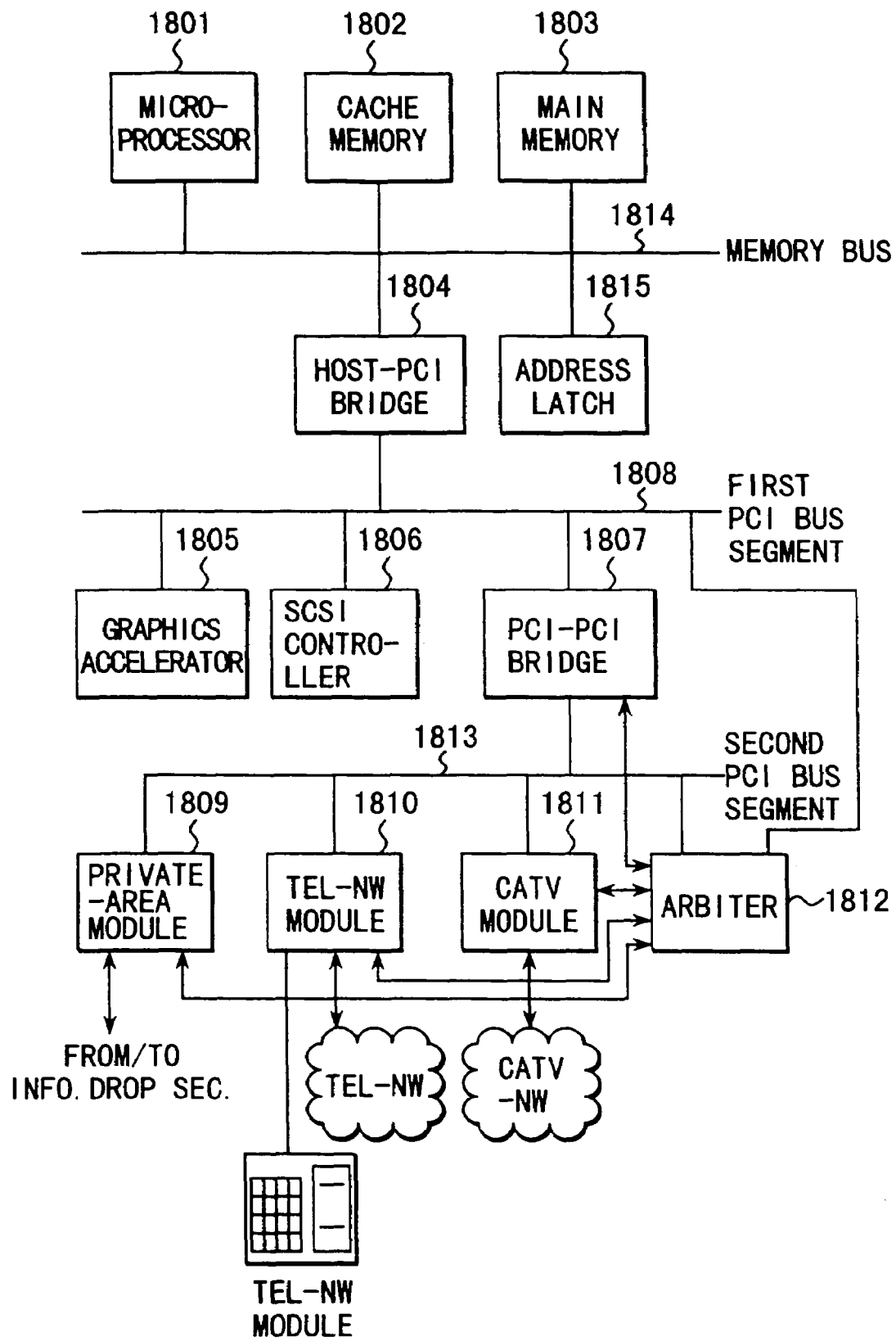
FIG. 8 is a block diagram showing an example of the arrangement of an information box according to the embodiment of the present invention.

The arrangement and operation of each information box will be described in detail next. FIG. 8 shows the detailed hardware arrangement of each of the information boxes 1121 and 1601 (to be generally referred to as the information box 1121 hereinafter) shown in FIGS. 1A and 1B and 6.

2.2.1 Arrangement of Information Box

As described above, the information box 1121 converts pieces of information from various information sources into digital data and cells, and outputs them to the information drop sections 1122-$i$ to transmit them to the various AVI (Audio/Video/Information) apparatuses in the homes. The information box 1121 also has the function of relaying information to be exchanged between the information drop sections 1122-$i$ and a network outside the home. In addition, the information box 1121 is constituted by modules desired and selected by the user from modules respectively having interface functions for various existing new information sources, networks, and information services. The information box can therefore be formed at a low cost. Note that one of the modules incorporated in the information box has an interface function between the information drop sections 1122-$i$ constituting the home network and the information box 1121.

The information box 1121 shown in FIG. 8 incorporates a private area module 1809 having an interface function for the information drop sections 1122-$i$, a telephone network module 1810 having an interface function for the conventional telephone network, and a CATV module 1811 having an interface function for the CATV network. With the use of the information box 1121 having the arrangement shown in FIG. 8, the user can hold a TV program supplied through the CATV network in the video server 1112, and enjoy the held TV program in an arbitrary room in the house. The user can also use the personal computer 1111 to capture one frame of the TV program held in the video server 1112, and transmit the captured bitmap image to one of his/her friends through the telephone network. In addition, character recognition of the characters on the captured frame can be performed on the personal computer 1111 in FIG. 1 to automatically form a postal card for entering a prize quiz or the like. That is, pieces of information provided from various information sources can be used in accordance with a combination of the private area module 1809, the telephone network module 1810, and the CATV module 1811.

Referring to FIG. 8, a microprocessor 1801, a cache memory 1802, and a main memory 1803 are connected to a memory bus 1814. A graphics accelerator 1805 and a SCSI (Small Computer System Interface) controller 1806 are connected to a first PCI bus segment 1803. The private area module 1809, the telephone network module 1810, and the CATV module 1811 are connected to a second PCI bus segment 1813. The first and second PCI bus segments 1808 and 1813 are formed by the PCI (Peripheral Component Interconnected) bus technique which has recently received a great deal of attention as a technique of realizing high-speed buses in personal computers.

According to the known PCI bus technique, a HOST-PCI bridge 1804 is used to connect the memory bus 1814 to the first PCI bus segment 1808, and a PCI-PCI bridge 1807 is used to connect the first PCI bus segment 1808 to the second PCI bus segment 1813. In a standard PCI bus system, arbiters are required for the respective PCI bus segments. Referring to FIG. 8, an arbiter 1812 is connected to the second PCI bus segment 1813. This arbiter 1812 has a function unique to the present invention, as will be described in detail later, instead of having a standard PCI bus function. An arbiter (not shown in FIG. 8 for the sake of illustrative convenience) is also required for the first PCI bus segment 1808. This arbiter may be a standard PCI bus arbiter. Note that an address latch 1815 is connected to the memory bus 1814 as a function other than those defined by the PCI bus standards.

Cards used for a general personal computer, e.g., the graphics accelerator 1805 and the SCSI controller 1806, are connected to the first PCI bus segment 1808, as shown in FIG. 8. Note that the types of cards to be connected to the first PCI bus segment 1808 are not limited as long as PCI-bus-compatible cards are used. Although PCI-bus-compatible cards can be connected to the second PCI bus segment 1813, the second PCI bus segment 1813 in the information box 1121 of the present invention serves to connect the modules 1602, 1603, 1604, and 1605 contained in the information box 1121.

An operation to be performed for data transmission through the PCI-PCI bridge 1807 between the microprocessor 1801, the cache memory 1802, the main memory 1803, the HOST-PCI bridge 1804, the graphics accelerator 1805, and the SCSI controller 1806 is the same as that in a personal computer having a general PCI bus. For this reason, a detailed description of this operation will be omitted.

The hardware of the information box of the present invention is characterized by the second PCI bus segment. On the second PCI bus segment 1813, ATM cells are exchanged as messages on the PCI bus, as well as general messages exchanged on the PCI bus. No control need be required from the microprocessor 1801 to perform ATM cell transmission between the private area module 1809, the telephone network module 1810, and the CATV module 1811 connected to the second PCI bus segment 1813. For example, cells can be transmitted between the private area module 1809 and the telephone network module 1810 even while the microprocessor 1801 is writing relatively long data in the graphics accelerator 1805. That is, cells can be simultaneously transmitted on the first and second PCI bus segments 1808 and 1813, and hence all the throughput of the PCI bus can be provided for the home network. ATM cells are transmitted between each module and the microprocessor 1801 through the PCI-PCI bridge 1807 and the HOST-PCI bridge 1804, and the address latch 1815 is arranged for this transmission.

The detailed arrangement and operation of the information box 1121 will be described next mainly in association with the second PCI bus segment 1813 as the characteristic feature of the present invention.

2.2.2 ATM Cell Transmission on PCI Bus

Figure 9:
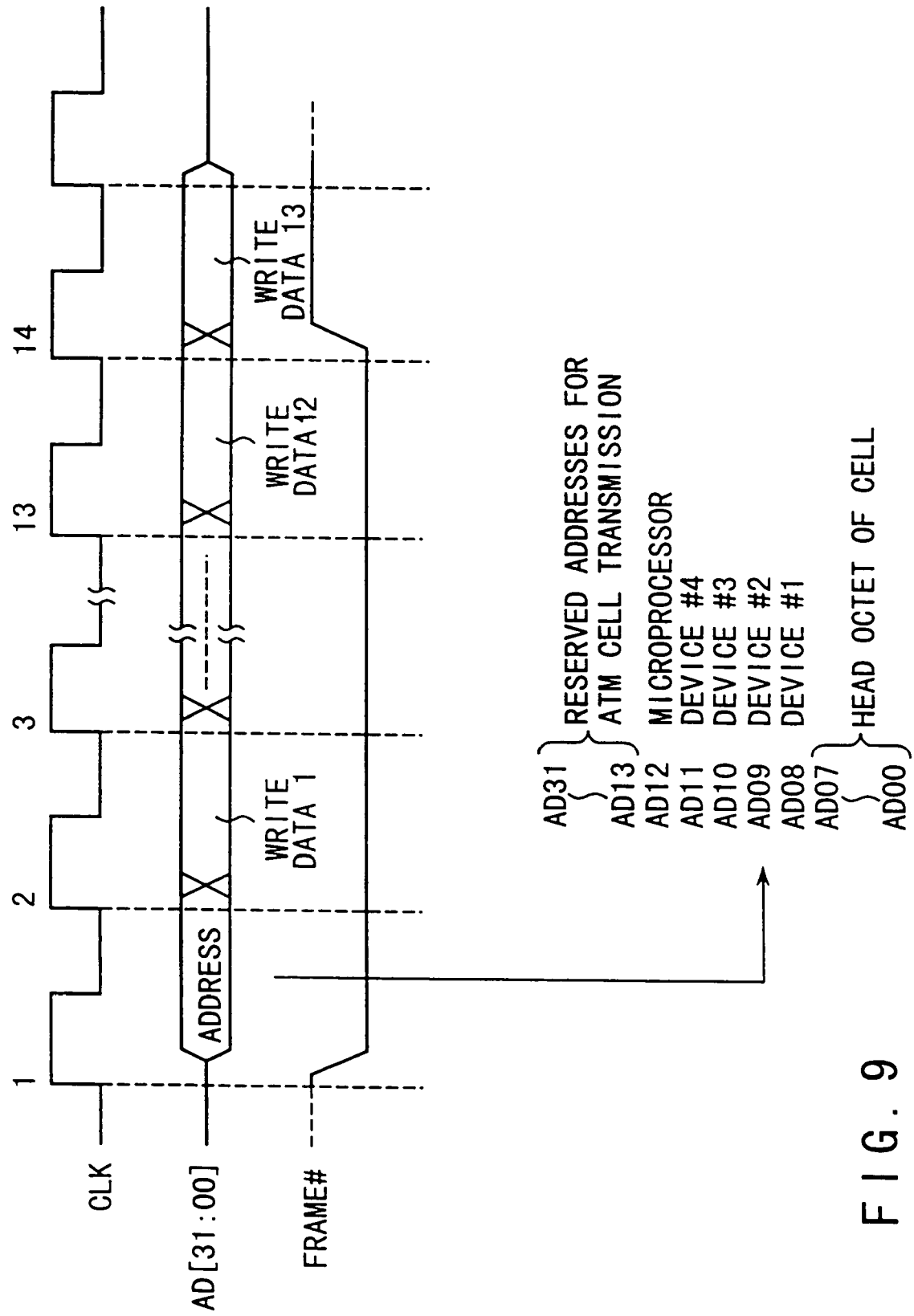
FIG. 9 is a timing chart for explaining a method of transmitting ATM cells inside the information box in FIG. 8.

ATM cell transmission on the PCI bus which is a characteristic feature of the present invention will be described in detail first. FIG. 9 is a timing chart showing ATM cell transmission on the PCI bus. In information transmission on the standard PCI bus, read/write data are transmitted after address words are transmitted in units of 32 or 64 bits. FIG. 9 shows a case in which data are transmitted in units of 32 bits. Address words and read/write data are transmitted by using 32 signal lines called AD[31:00]. A signal FRAME# is a signal indicating that a sequential write/data transmission operation corresponding to one address word is in progress. Note that a negative-logic signal, i.e., a signal regarded as active at logic level "L", is expressed by the symbol "#0" according to the PCI standard description method. A signal on the PCI bus changes in synchronism with the leading edge of a single clock CLK, and is sampled in synchronism with the trailing edge of the clock.

A functional section connected to the PCI bus and designed to perform data transfer on the PCI bus will be referred to as a device of the components of the information box shown in FIG. 8, the devices are the microprocessor 1801, the graphics accelerator 1805, the SCSI controller 1806, the private area module 1809, the telephone network module 1810, and the CATV module 1811. A device which dominates data transmission on the PCI bus by using the PCI bus at a given timing will be referred to as a master device. FIG. 9 is the timing chart showing a case in which the master device writes data. In a data write operation, an address word is output from the master device, and write data is continuously output from the master device, thereby allowing bust transmission of the data. When the master device is to perform a data read operation, the master device outputs an address word. After the lapse of a time corresponding to several clocks, the master device sets the bus driver in a high-impedance state, and the device (slave device) designated by the address word sets the bus driver in a low-impedance state. When the master device is to perform a data read operation, such a time-wasting procedure is required. An ATM cell can be transmitted from a given device to another device by using either the data read procedure or the data write procedure. In the present invention, cell transmission is performed by using the data write cycle in consideration of the effective use of the PCI bus band. An ATM cell has a length of 53 bytes. For this reason, when an ATM cell is to be transmitted by using a read/write data transmission word based on the PCI bus standards, 32-bit data transmission must be performed 13 times, and 8-bit data transmission must be performed once.

Note that all the bits of an address word need not be used to designate a device. If, for example, the lower 8 bits of an address are not used for address designation, it can be regarded that an address consisting of consecutive 256 words is assigned to a given device. In order to improve the utilization efficiency of the PCI bus by using this characteristic feature, the information box of the present invention uses the lower 8 bits of an address word for cell transmission as well as a write data word. That is, the upper 24 bits of the address word are used to designate an ATM cell transmission destination, and the lower 8 bits are used to transmit part of the data of the ATM cell. With this cell transmission scheme, the minimum number of clocks required for cell transmission on the PCI bus can be decreased from 15 clocks based on the PCI standards to 14 clocks, thus improving the utilization efficiency of the PCI bus. Note that the data of the HEC field of an ATM cell is preferably transmitted by using an address transmission word.

In order to discriminate a message for ATM cell transmission on the PCI bus from other general messages for a data read/write operation on the PCI bus, an address indicating the message for ATM cell transmission is reserved on the address space of the PCI bus. A specific bus as a transmission destination is expressed in the so-called bitmap form. More specifically, in the case of the 32-bit PCI bus in FIG. 9, the address values reserved for ATM cell transmission are set at AD31 to AD13 of the address transmission word, and pieces of bitmap information for device designation are set at AD12 to AD08.

In this embodiment, the destination of an ATM cell to be transferred from a given device on one PCI bus segment is another device on the PCI bus segment to which the given device belongs, or the microprocessor 1801. According to the PCI bus standards, the number of devices which can be connected to the same bus segment is greatly limited (for example, four for a PC card). For this reason, bitmap information for device designation may be expressed by 5-bit information indicating that the ATM cell to be transferred is received by the microprocessor 1801 or one of the four devices.

The ATM cell output from the microprocessor 1801 must be transmitted to an arbitrary device on an arbitrary PCI bus segment. For this purpose, a special address indicating-ATM cell transmission takes a value unique to each PCI bus segment included in the system. The destination PCI bus segment of an ATM cell output from the microprocessor 1801 is designated by the address reserved on each PCI bus segment for this ATM cell transmission.

A method of using an address transmission word for a message on the PCI bus which is used to designate the destination of an ATM cell will be described in detail next with reference to FIG. 8. Different addresses on the PCI bus are assigned to the first and second PCI bus segments 1808 and 1813 in FIG. 8. For example, for the sake of ATM cell transmission, the address space in which all AD31 to AD13 are expressed by "1" is assigned to the first PCI bus segment 1808, and the address space in which all AD31 to AD14 are expressed by "1" and AD13 is expressed by "0" is assigned to the second PCI bus segment 1813. In this case, when the microprocessor 1801 is to transfer an ATM cell to device #1 and device #3 on the second PCI bus segment 1813, the address word is expressed as follows:

AD31 to AD14: all "1"s

AD13: "0"

AD12 to AD08: "00101"

AD07 to AD00: HEC field of ATM cell to be transmitted

When a device on the second PCI bus segment 1813 is to transmit an ATM cell to the microprocessor 1801, the address word is expressed as follows:

AD31 to AD14: all "1"s

AD13: "0"

AD13 to AD08: "10000"

AD07 to AD00: HEC field of ATM cell to be transmitted

Information transmission on the PCI bus includes a master device determination phase based on arbitration and a data transmission phase based on designation by a master device. A master device is determined by the arbiter while data transmission is performed by the previously determined master device. That is, the information transmission capacity on the PCI bus is not reduced by an arbiter operation. The arbiter operation associated with ATM cell transmission and ATM cell transmission between devices will be sequentially described below.

(1) Arbitration

Arbitration is an operation to be performed to determine a specific device as a master device at a given timing. This operation is executed by the arbiter. According to the PCI standards, it is required that two signal lines, i.e., a bus request line REQ# and a bus response line GNT# be installed between the arbiter and the respective devices to realize arbitration. Each device activates a bus request line to use the PCI bus. The arbiter refers to the input levels of the bus request lines activated by devices to determine a specific device to which the right to use the bus is to be given. According to the present invention, it is assumed that each module uses the information transmission capacity on the PCI bus in proportion to a predetermined band on the basis of the principle of ATM communication. Based on this assumption, the information box assigns proper information transmission capacities to various apparatuses and information sources. The arrangements and operations of the arbiter 1812 and the respective devices which allow the use of information transmission capacities proportional to assigned bands and constitute a characteristic feature of the present invention will be described in detail later, but will be briefly described below. First of all, the microprocessor 1801 registers, in the arbiter 1812, bands which the respective modules can use on the second PCI bus segment 1813. The arbiter 1812 assigns bus transmission rights to the respective modules to assign the bands, which have been registered for the respective modules, to the respective modules.

(2-1) ATM Cell Transmission: On Second PCI Bus Segment 1813

A module to which the right to use is given from the arbiter 1812 outputs a message conforming to the ATM cell transmission form on the PCI bus to the second PCI bus segment 1813. The destination of the output message is designated by the upper 24 bits of the address word of the message. Each module always refers to every address word appearing on the second PCI bus segment 1813, and receives a cell having an address word determined as one addressed to the module. An address word contains part of the data of an ATM cell. In reproducing the ATM cell, therefore, each module must couple the part of the ATM cell in this address word to the remaining part of the ATM cell to be subsequently transferred as write data. Since the bitmap form is used to designate a destination module, an ATM cell can be easily copied, as in the above case.

(2-2) ATM Cell Transmission: from Second PCI Bus Segment 1813 to Microprocessor 1801

ATM cells output from a module on the second PCI bus segment 1813 include ATM cells to be transmitted to another module and ATM cells which are transmitted to the microprocessor 1801 to receive services from the microprocessor 1801. For example, the ATM cells which must receive services from the microprocessor 1801 include ATM cells (C-plane (control-plane) ATM cells) carrying messages required for connection setting, and FREE cells (M-plane (management-plane) cells) generated by remote terminals. The ATM cells transmitted on only the second PCI bus segment 1813 are U-plane (user-plane) ATM cells which are mainly exchanged between the users. Similar to the other devices, 1 bit of bitmap information is assigned to the microprocessor 1801. That is, an ATM cell to be transmitted between modules on only the second PCI bus segment 1813 is discriminated from an ATM cell to be transmitted from the second PCI bus segment 1813 to the microprocessor 1801 in accordance with the address words.

An ATM cell in which the address of the microprocessor 1801 is written is transmitted in the information box in the following manner to be written in the main memory 1803. The microprocessor 1801 then provides a predetermined service for the ATM cell stored in the main memory 1803. When a PCI bus message containing an ATM cell addressed to the microprocessor 1801 is output from one module to the second PCI bus segment 1813, the arbiter 1812 receives the message. The arbiter 1812 then transmits a bus request to an arbiter (not shown) for the first PCI bus segment 1808 to write the ATM cell in the main memory 1803 through the first PCI bus segment 1808 and the HOST-PCI bridge 1804. When a path to the main memory 1803 is ensured by the arbiter (not shown) for the first PCI bus segment 1808, the arbiter 1812 writes the ATM cell in the main memory 1803. At this time, the address latch 1815 on the memory bus 1814 temporarily holds the address word containing part of the data of the ATM cell. The microprocessor 1801 refers to the contents of the data written in the main memory 1803 and the contents of the data written in the address latch 1815 to reproduce the transmitted ATM cell. Note that the next ATM cell is transmitted before the microprocessor 1801 refers to the address word written in the address latch 1815. In consideration of this situation, the address latch 1815 is required to have the capacity to hold a plurality of address words. Such a state also occurs when a plurality of processes of receiving ATM cells simultaneously operate on the microprocessor 1801.

If each of the first and second PCI bus segments 1808 and 1813 has a width of 32 bits, 1 byte of an ATM cell is transmitted with an address word. The HEC field of an ATM cell is 1 byte long and carries no ATM cell information. If, therefore, an HEC field is transmitted with an address word, the microprocessor 1801 can reproduce the transmitted ATM cell even without the address latch 1815. If an HEC (Header Error Control) field is required, the field may be calculated according to a calculation method defined by ITU-T I.432. The HEC field is used to detect/correct a bit error in the header portion. Since parity bits are added to the address/data signal lines AD[31:00] of the PCI bus, it is not almost necessary to transmit an HEC field from a module to the microprocessor 1801.

(2-3) ATM Cell Transmission: from Microprocessor 1801 to Second PCI Bus Segment 1813

The microprocessor 1801 transmits a cell to the second PCI bus segment 1813 through the PCI-PCI bridge 1807. As described above, an address word used for ATM cell transmission contains an address value reserved for ATM cell transmission on the second PCI bus segment 1813. A message containing an ATM cell on the PCI bus is transmitted to the second PCI bus segment 1813 through the HOST-PCI bridge 1804 and the PCI-PCI bridge 1807. In this case, in order to improve the throughput of the information box 1121, it is preferable that the PCI-PCI bridge 1807 temporarily hold the message on the PCI bus to allow independent execution of arbitration on the first PCI bus segment 1808 and arbitration on the second PCI bus segment 1813.

An ATM cell is transmitted to a device on the second PCI bus segment 1813, and at the same time, the device is controlled by the microprocessor 1801. More specifically, the microprocessor 1801 designates a reception channel for the CATV module 1811. In addition, the microprocessor 1801 recognizes a terminating call generated from an external telephone network to the telephone network module 1810, notifies the telephone network module 1810 of a telephone number for which an originating call is to be generated, or receives a transmission request for an originating message containing the telephone number designated by the telephone network module 1810 in advance. In addition, the microprocessor 1801 sets bands assigned to the respective modules with respect to the arbiter 1812, or designates the operation mode of each module. Such information exchanged between a device on the second PCI bus segment 1813 and the microprocessor 1801 need not be transmitted with an ATM cell, but may be read/written in/from a register by using a general message on the PCI bus. When each device on the second PCI bus segment 1813 is to perform ATM cell transmission and information transmission between such a register group and a processor, an address for register access is supplied to each device.

2.2.3 Supplementary Explanation about ATM Cell on PCI Bus

As is apparent, ATM cell transmission on the system bus of the microprocessor can also be applied to a system bus in another form, such as Futurebus-II, that allows burst transmission. In this embodiment, the length of a burst transmitted from a device on the system bus is set to a predetermined value or less in order to simplify arbitration. When this scheme is applied to a system bus other than the PCI bus as well, the bust transmission time is preferably set to a predetermined value or less. In addition, the above ATM cell transfer on the system bus of the microprocessor can be applied to not only a 32-bit system bus but also a 64-bit system bus. In the case of a 64-bit system bus, one cell can be transmitted by transmitting 40 bits of the address word and transmitting 64-bit data six times. In this case, however, the address latch 1815 cannot be omitted.

2.2.4 Use of Bus Request on Second PCI Bus Segment

On the second PCI bus segment 1813 serving as a communication line between modules, the band assigned to each module must be guaranteed. For this reason, the arbiter 1812 for the second PCI bus segment 1813 has a function different from that of an arbiter for a general PCI bus segment, as will be described below.

Use of bus request arbitration executed by the arbiter 1812 will be described first. There are two types of use of bus requests processed by the arbiter 1812 for the second PCI bus segment 1813; they are a use of bus request from the PCI-PCI bridge 1807, and an ATM cell transmission request from each module on the second PCI bus segment 1813.

The PCI-PCI bridge 1807 transmits use of bus requests in the following two cases. In the first case, the PCI-PCI bridge 1807 receives, from the first PCI bus segment 1808, a use of bus request which is used to read/write data designating the same address as that flowing on the general PCI bus, and transmits the request. A use of bus request for the second PCI bus segment 1813 is a use of bus request which is transmitted from the microprocessor 1801 and used for a register read/write operation for each device. In the second state, the PCI-PCI bridge 1807 receives, from the first PCI bus segment 1808, a use of bus request for ATM cell transmission using a message on the above PCI bus, and transmits the request. A use of bus request of this type is generated when an M-plane/C-plane ATM cell generated by the microprocessor 1801 is transmitted outside the information box through a certain module.

An ATM cell transmission request on the second PCI bus segment 1813 will be described next. Assume that a device on the second PCI bus segment 1813 does not become a master device which transmits a message for reading/writing data by designating the same address as that flowing on the general PCI bus. Based on this assumption, each module transmits use of bus requests in the following two cases. In the first case, a use of bus request for ATM cell transmission from one of the modules on the second PCI bus segment 1813 to another module is transmitted. This case occurs when a CATV program received by the CATV module 1811 is distributed into the home through the private area module 1809. In the second case, a use of bus request used to finally transmit an ATM cell to the microprocessor 1801 is transmitted from the second PCI bus segment 1813. ATM cells transmitted to the microprocessor 1801 are mostly C-plane and M-plane ATM cells.

2.2.5 Priority Control Over Bus Request on Second PCI Bus Segment 1813

The arbiter 1812 receives two types of use of bus requests from the PCI-PCI bridge 1807, and two types of use of bus requests from each module. The arbiter 1812 then properly permits each module to use the bus. In arbitrating between use of bus requests from a plurality of devices, the arbiter 1812 generally determines a specific use of bus request to which the highest priority is to be given in accordance with the priorities assigned to the respective devices in advance.

Of the four types of use of bus requests, a use of bus request to which the highest priority must be given is a use of bus request which is associated with ATM cell transmission from each module inside the second PCI bus segment 1813. For example, this use of bus request includes a use of bus request associated with ATM cell transmission for the transmission of continuous media information received by the CATV module 1811. The arbiter 1812 must assign the bus in response to a use of bus request of this type with the minimum delay. If the bus is not assigned for a long period of time with respect to the use of bus request for continuous media information, the processing of the continuous media information is greatly affected; for example, a reproduced frame is disturbed.

The second highest priority must be given to a use of bus request associated with the transmission of a C-plane/M-plane ATM cell from each module to the microprocessor 1801 or from the microprocessor 1801 to each module. Control information required for the operation of the home network is transmitted between the respective communication apparatuses with such ATM cells. For this reason, the bus is preferably assigned in response to a use of bus request of this type with the minimum delay.

The lowest priority can be given to a use of bus request associated with a register read/write operation from the microprocessor 1801 and each device. When the arbiter 1812 is to assign the bus in response to a use of bus request of this type, a delay of, e.g., several ten milliseconds is allowed. Even with this delay, the operation of the information box 1121 is only slightly delayed.

The devices in this embodiment may output use of bus requests with different priorities. For example, each module outputs an ATM cell in the second PCI bus segment 1813 which has the highest priority or an ATM cell addressed to the microprocessor 1801 and having the second highest priority. The arbiter 1812 must permit a given device to use the bus in accordance with use of bus requests output from the device and having different priorities.

When the arbiter 1812 is to perform priority control over the use of the bus on the basis of four different priorities, two problems are posed. The first problem is that the type of use of bus request from each module or the PCI-PCI bridge 1807 cannot be determined until it is determined that the use of bus request is associated with a specific access to a specific address of a specific device. That is, the type of use of bus request cannot be determined until the address word of a message on the PCI bus is output after the right to use the bus is given. The second problem is that only one type of use of bus request signal from each device is defined by the PCI bus standards. In addition, according to the PCI bus standards, there is no means for notifying the arbiter 1812 of the priority of a use of bus request output from each device to the arbiter. That is, the PCI bus standards are not made on the assumption that one device outputs messages having different priorities to the PCI bus. According to the PCI bus standards, the arbiter 1812 cannot be notified of all pieces of information required to determine priorities at the arbitration timing of the arbiter 1812. That is, the arbiter 1812 must perform arbitration on the basis of insufficient priority information. Each module outputs, to the arbiter 1812, either a use of bus request associated with ATM cell transmission in the second PCI bus segment 1813 and having the highest priority or a use of bus request associated with the ATM cell transmission to the microprocessor 1801 and having the second highest priority. Before determining the priority of the use of bus request, the arbiter 1812 must determine on the basis of the received use of bus request whether to permit the use of the bus.

Arbitration associated with ATM cell transmission from the second PCI bus segment 1813 to the microprocessor 1801 is performed as follows. According to the PCI bus standards, first of all, a use of bus request is transmitted from a module, which outputs a transmission request, to the arbiter 1812. The request is then transmitted from the arbiter 1812 to the arbiter (not shown) for the first PCI bus segment 1808 through the PCI-PCI bridge 1807. The request is further transmitted to the HOST-PCI bridge 1804. As a result, arbitration with a use of bus request from the microprocessor 1801 is performed. That is, data transmission of this type uses the first PCI bus segment 1808 and the memory bus 1814 as well as the second PCI bus segment 1813. As a result, this data transmission is influenced by another information transmission process, e.g., information transmission between the graphics accelerator 1805 and the main memory 1803. That is, the time interval between the instant at which a use of bus request is supplied to the arbiter 1812 and the instant at which the bus is actually used may become very long. In addition, since this time interval greatly changes in accordance with the operation states of processes which operate on the microprocessor 1801, it is difficult for the arbiter 1812 on the second PCI bus segment 1813 to assign predetermined bands to the respective modules. Such arbitration is permitted for ATM cell transmission to the microprocessor 1801 but is not permitted for ATM cell transmission in the second PCI bus segment 1813 in which continuous media transmission may be included.

When a device on the second PCI bus segment 1813 becomes a master device, it takes much time to perform arbitration. In this embodiment, therefore, every module on the second PCI bus segment 1813 is inhibited from serving as a bus master and performing transmission of a message, on the PCI bus, which is used for a general data read/write operation, other than ATM cell transmission.

The arbiter 1812 in the present invention temporarily holds an ATM cell output from a module on the second PCI bus segment 1813 and addressed to the microprocessor 1801, and independently performs arbitration on the first PCI bus segment 1808. The arbiter 1812 then outputs the held ATM cell to the microprocessor 1801. That is, an area in which an ATM cell addressed to the microprocessor 1801 is held is defined in the second PCI bus segment 1813 to shorten the time required for arbitration when a device on the second PCI bus segment 1813 becomes a bus master. As a result, a predetermined band can be easily assigned to each module. More specifically, the arbiter 1812 performs arbitration on the first PCI bus segment 1808 after performing arbitration on the second PCI bus segment 1813. With this operation, upon reception of a use of bus request, the arbiter 1812 performs arbitration on the basis of the request, and can assign a desired band to each module, without receiving, for example, information for indicating the priority of a use of bus request in the second PCI bus segment 1813 and the priority of a use of bus request which has a lower priority and is associated with ATM cell transmission to the microprocessor 1801. In this case, the arbiter 1812 can give the right to use the bus more quickly in response to a use of bus request for ATM cell with a high priority than that in response to a use of bus request for ATM cell transmission with a low priority. That is, the bus is assigned to each ATM cell transmission in accordance with the priority, thereby realizing desired priority control.

It should be noted that in the above priority control method, each module does not discriminate a use of bus request for communication in the second PCI bus segment 1813 from a use of bus request for ATM cell transmission to the microprocessor 1801. With this priority control, the sum of a band for U-plane ATM cells and a band for M-plane/C-plane ATM cells is assigned to each module. It is preferable that the frequency of M-plane/C-plane ATM cell transmission be sufficiently lower than that of U-plane ATM cell transmission. ATM communication systems are generally designed on the basis of this condition. No problem is therefore posed even if a system is constructed on the basis of this condition.

As in the case in which messages on the PCI bus are transmitted from the modules on the second PCI bus segment 1813 to the microprocessor 1801, in the case in which messages on the PCI bus are to be transmitted from the microprocessor 1801 to the devices on the second PCI bus segment 1813 through the first PCI bus segment 1808, all pieces of information indicating the priorities of the messages cannot be transmitted to the arbiter 1812. In this case, however, since all the messages on the PCI bus are generated by the microprocessor 1801 regardless of the priorities, it suffices if the microprocessor 1801 properly controls the priorities associated with the executing order of the processes of generating these messages so as to perform priority control over the messages.

2.2.6 Detailed Arrangement and Operation of Arbiter 1812

The detailed arrangement and operation of the arbiter are not specified by the current PCI bus standards. The arbiter 1812 in the present invention is characterized in that the arbiter distributes the data transmission capacity of the second PCI bus segment 1813 to the respective modules in proportion to the bands assigned thereto while maintaining the above priorities. The arrangement and operation of the arbiter 1812 will be described in detail below.

(1) Brief Explanation of Arrangement and Operation of Arbiter 1812

FIG. 10 shows an arrangement of the arbiter 1812. A procedure for arbitration executed by the arbiter 1812 will be briefly described below. A bus request signal output from each module before ATM cell transmission and a bus request signal from the arbiter 1812 are temporarily sampled by a bus request sampling register 2001. A transmission authorization signal generator 2004 generates ATM cell transmission authorization signals for the respective modules in proportion to the bands assigned to the respective modules. These signals are sampled by transmission authorization signal latch registers 2005 corresponding to the respective modules. A controller 2002 refers to the sampling results obtained by these two types of registers 2001 and 2005 to determine a device to which the right to use the bus is to be given. The controller 2002 then outputs a grant signal (GNT#) defined by the PCI bus standards to the device to which the right to use the bus is to be given.

As described above, the arbiter 1812 has the function of transmitting cells from the second PCI bus segment 1813 to the first PCI bus segment 1808. This function is realized by a first PCI protocol processor 2003, an address decoder 2006, a selector 2007, a cell buffer 2008, and a second PCI protocol processor 2009. The controller 2002 performs control associated with the right to use the bus over this cell transmission.

The operation of the arbiter 1812 will be described in detail next with reference to FIG. 10.

(2) Definition of Band Assigned to Each Module

The arbiter 1812 has the function of distributing the communication capacity of the second PCI bus segment 1813 to the respective modules in accordance with the bands assigned thereto. In order to realize this function, bands must be defined on each PCI bus segment. In order to define the bands, the arbiter 1812 sets a cell slot and a cell time on the basis of a CLK signal on the PCI bus. More specifically, the cell slot is set to have a length corresponding to the number of clocks required in the time interval between the instant at which authorization to use the bus is given to a certain device and the instant at which the bus driver for the device set in a low-impedance state to complete transmission of one cell. The arbiter 1812 defines the cell time by sequentially counting such cell slots. With the use of this cell slot and cell time, the minimum interval during which a cell can be transmitted when each module uses the band assigned thereto is set (definition of the band) according to the ITU-T standard 1.432. This interval is measured with the cell slot.

(3) Operation of Transmission Authorization Signal Generator 2004

The transmission authorization signal generator 2004 has the function of sequentially assigning cell slots on the second PCI bus segment 1813 to the respective modules in accordance with the bands assigned thereto. Various arrangements may be designed for this function. However, the arrangement of the function has no special influences on the validity of the present invention, and hence is not specifically limited.

In setting connection between modules on the second PCI bus segment 1813, the microprocessor 1801 performs predetermined setting for the respective modules and notifies the transmission authorization signal generator 2004 of the arbiter 1812 of the band assigned to the module on the cell transmission side. This band corresponds to the cell transmission interval during which a cell is transmitted in the band assigned to the module in advance.

Upon the notification of the band assigned to a given module in advance from the microprocessor 1801, the transmission authorization signal generator 2004 calculates the cell time at which the module can transmit the cell next, and generates an ATM cell transmission authorization signal for permitting the module to transmit the cell.

(4) Operation of Controller 2002

The controller 2002 refers to the use of bus request from the device (module) on the arbiter 1812 and the transmission authorization signal for each module which is generated by the transmission authorization signal generator 2004 to determine a device to which the right to use the bus in the next slot is to be given. In outputting one of the above four types of use of bus requests with respect to the second PCI bus segment 1813, each module and the PCI-PCI bridge 1807 assert bus request signals (REQ#) with respect to the arbiter 1812. The bus request signal (REQ#) from each module on the second PCI bus segment 1813 is sampled by the bus request sampling register 2001 at a predetermined timing in a cell slot. For example, the bus request sampling register 2001 is constituted by a plurality of D-type flip-flop circuits.

At the same time when sampling is performed by the bus request sampling register 2001, the transmission authorization signal for each module which is generated by the transmission authorization signal generator 2004 is reflected on the output state of the transmission authorization signal latch register 2005. For example, the transmission authorization signal latch register 2005 is constituted by a plurality of set-reset type flip-flop circuits with clock inputs. If the transmission authorization signal has been asserted by the transmission authorization signal generator 2004, the flip-flop circuit, of the flip-flop circuits constituting the transmission authorization signal latch register 2005, which corresponds to the device to which cell transmission authorization has been given.

The controller 2002 determines a device to which the right to use the bus is to be given in the next cell slot on the basis of the information sampled by the registers 2001 and 2005. This operation is arbitration. In order to realize the above priority control, arbitration in each cell slot may be performed as follows. The controller 2002 counts the number of bus request signals (REQ#) from each module. If there is no module which outputs a use of bus request, the controller 2002 checks a bus request signal (REQ#) from the PCI-PCI bridge 1807. If the PCI-PCI bridge 1807 has output a use of bus request, the controller 2002 gives the PCI-PCI bridge 1807 the right to use the bus. If the PCI-PCI bridge 1807 has output no use of bus request, the next cell slot becomes idle, i.e., no device output information. When one or a plurality of modules have output one or a plurality of bus request signals (REQ#), the controller 2002 checks whether one of the flip-flops of the transmission authorization signal latch register 2005, which flip-flops correspond to the modules which have output the bus request signals (REQ#), is set. If none of the flip-flops of the transmission authorization signal latch register 2005 which correspond to the modules which have output the bus request signals (REQ#) is set, the controller 2002 checks a bus request signal (REQ#) from the PCI-PCI bridge 1807. If the PCI-PCI bridge 1807 has generated a use of bus request, the controller 2002 gives the PCI-PCI bridge 1807 the right to use the bus. If the PCI-PCI bridge 1807 has required no use of bus request, the next cell slot becomes idle. If one of the flip-flops of the transmission authorization signal latch register 2005, which flip-flops correspond to the modules which have output the bus request signals (REQ#), is set, the controller 2002 gives the module the right to use the bus. Thereafter, the flip-flop of the transmission authorization signal latch register 2005 which corresponds to the module to which the right to use the bus is given is reset.

When the right to use the bus is given to a certain module in a given cell slot with the above operation, the right to use the bus is not given to the module in the subsequent cell slots unless the transmission authorization signal generator 2004 outputs a cell transmission authorization signal to the module. Therefore, the right to use the bus can be given to each module in accordance with the band assigned thereto in advance. When no bus request signal (REQ#) is output from any module, or the controller 2002 determines that no ATM cell should be output from any module because of band limitation, the controller 2002 gives the PCI-PCI bridge 1807 the right to use the bus, thereby realizing the above priority control.

Since a cell slot is defined on the second PCI bus segment 1813, and the band assigned to each module is guaranteed on the basis of the cell slot, it is preferable that an entire message transmitted from the microprocessor 1801 to the second PCI bus segment 1813 through the PCI-PCI bridge 1807 be accommodated in the cell slot. By imposing such limitation to each message, the microprocessor 1801 can control each module within the time during which communication is performed between modules.

(5) ATM Cell Transmission from Second PCI Bus Segment 1813 to Microprocessor 1801

An ATM cell output from a given module to which the right to use the bus is given is transmitted to all the devices connected to the second PCI bus segment 1813. As described above, each device refers to the address transmission word of the ATM cell transmitted as a message on the PCI bus, and receives the cell if it is addressed to the device itself.

The address decoder 2006 of the arbiter 1812 refers to the address of a PCI message on the second PCI bus segment 1813. Upon detecting a message which has an address reserved for ATM cell transmission and in which bits for the processor, of bitmap information, are set, the address decoder 2006 controls the selector 2007 to temporarily enqueue the PCI message (ATM cell) to the cell buffer 2008 in the arbiter 1812. The PCI protocol processor 2003 controls this operation in accordance with the PCI bus standards.

The controller 2002 always monitors whether a cell is held in the cell buffer 2008. If a cell is held in the cell buffer 2008, the controller 2002 asserts a bus request signal (REQ#) to the arbiter for the first PCI bus segment 1808 to take part in arbitration on the microprocessor 1801. Upon reception of a grant signal (GNT#) (defined by the PCI bus standards) from the arbiter for the first PCI bus segment 1808, the controller 2002 transmits the first cell of the ATM cells held in the cell buffer 2008 to the first PCI bus segment 1808 under the control of the second PCI protocol processor 2009 (i.e., in accordance with the PCI bus standards).

When an ATM cell addressed to the microprocessor 1801 is output to the second PCI bus segment 1813, and the cell buffer 2008 is full, the arbiter 1812 may not load the ATM cell. In this case, although the ATM cell to be transmitted to the microprocessor 1801 does not reach the microprocessor 1801, such a situation may be handled by a high level communication protocol.

2.2.6 Private Area Module

The detailed arrangement and operation of each type of module inserted in the information box 1121 will be described by taking the private area module 1809 as an example.

Figure 11:
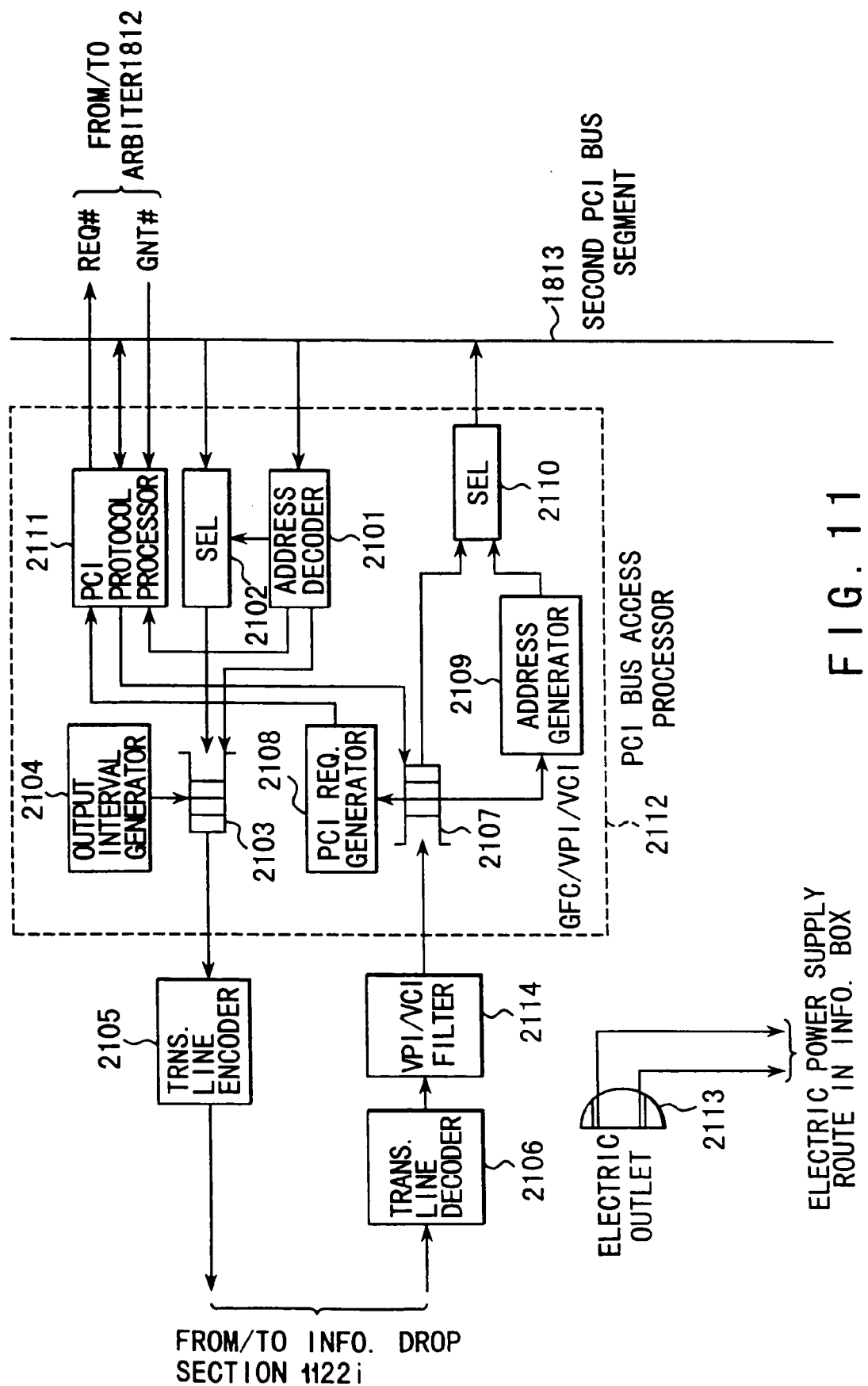
FIG. 11 is a block diagram showing an example of the arrangement of a private area module of the information box in FIG. 8.

FIG. 11 shows an example of the arrangement of the private area module 1809. The private area module 1809 has the function of loading a cell, of the ATM cells on the second PCI bus segment 1813, which is addressed to the module itself, and sending it to the information drop section 1122-$i$. The private area module 1809 also has the function of receiving a cell from the information drop section 1122-$i$, referring to the VPI/VCI data of the ATM cell, and transmitting the cell to each module through the second PCI bus segment 1813.

As described above, in the home network of the present invention, since the header conversion function is omitted to reduce the cost, the VPI/VCI data of ATM cells are made unique to the home, unlike the state-of-the art ITV-T standards. The VPI/VCI data of ATM cells on the second PCI bus segment 1813 may take a value unique to the home, or a value which is only valid on the second PCI bus segment 1813. In the latter case, the private area module 1809 requires no VPI/VCI data conversion function, and hence an arrangement more suitable for the gist of the present invention can be realized. The following description is therefore based on the assumption that a VPI/VCI value unique to the home is used on the second PCI bus segment 1813.

The ATM cell contained in a message on the PCI bus which is sent onto the second PCI bus segment 1813 is broadcast to all the devices on the second PCI bus segment 1813.

An address decoder 2101 in the private area module 1809 checks the address word of a message on the arbiter 1812. If the value of the address word holds an ATM cell and is to be received by the private area module 1809, the address decoder 2101 temporarily holds part (i.e., the HEC field if a 32-bit PCI bus is used) of the ATM cell in the address word, an controls a first selector 2102 to guide a data transmission word, which is transmitted afterward, to a transmission cell buffer 2103.

If a bit string of the ATM cell is contained in the address word, the bit string is guided from the transmission cell buffer 2103. The transmission cell buffer 2103 inserts the bit string sent from the address decoder 2101 in the data transmission word from the first selector 2102 at a proper position to reproduce the 53-byte ATM cell, and temporarily stores it.

An output interval generator 2104 provides the timing of transmission of the ATM cell from the transmission cell buffer 2103 to the home network. More specifically, the output interval generator 2104 generates a cell slot defined on the physical link between the information drop sections 1122-$i$, and notifies the transmission cell buffer 2103 at the head of each cell slot that the cell slot is started. Similar to the transmission authorization signal generator 2004 of the arbiter 1812 for the second PCI bus segment 1813, the output interval generator 2104 sequentially calculates an estimated arrival time TAT of an ATM cell on the basis of the band assigned to the private area module 1809 in advance. When the TAT coincides with the cell time, the output interval generator 2104 instructs the transmission cell buffer 2103 to output a valid cell. Note that the TAT is calculated on the basis of the cell slot defined on the physical link between the information drop sections 1122-$i$.

Upon reception of the valid cell output instruction from the output interval generator 2104, the transmission cell buffer 2103 outputs one of the valid cells (ATM cells) held by itself or an empty cell to a transmission line encoder 2105. The transmission cell buffer 2103 outputs an empty cell when only the head of a cell slot is notified by the output interval generator 2104 but no valid cell output instruction is received therefrom, or no valid cell to be output is held even through a valid cell output instruction is received from the output interval generator 2104. In other cases, the transmission cell buffer 2103 sequentially outputs the ATM cells held by itself in the order in which they are input. Upon reception of an empty cell or an ATM cell, the transmission line encoder 2105 converts it into a bit string in the signal form on the physical link, and transmits it to the information drop section 1122-i.

A bit string input from the information drop section 1122-i is converted into an ATM cell string by a transmission line decoder 2106, and transfers it to a VPI/VCI filter 2114. The VPI/VCI filter 2114 selects an ATM cell, of the received ATM cells, which is to be transmitted to the microprocessor 1801 through the second PCI bus segment 1813, and transfers it to a reception cell buffer 2107. The reception cell buffer 2107 temporarily holds the transferred ATM cell. Note that the information required for the VPI/VCI filter 2114 to select an ATM cell, i.e., the VPI/VCI value of the ATM cell, is notified by the microprocessor 1801 when connection is set on the home network.

A PCI request generator 2108 detects an ATM cell held in the reception cell buffer 2107, and notifies a PCI protocol processor 2111 of the detection of the cell. Upon reception of this notification, the PCI protocol processor 2111 outputs a bus request signal (REQ#) to the arbiter 1812 for the second PCI bus segment 1813 to request the use of the bus. Upon reception of a grant signal (GNT#) for permitting the use of the bus from the arbiter 1812, the PCI protocol processor 2111 instructs the reception cell buffer 2107 to output an ATM cell.

Upon reception of the ATM cell output instruction, the reception cell buffer 2107 notifies an address generator 2109 of the VPI/VCI data of the currently held ATM cells in the order in which they were held. When connection is to be set, the microprocessor 1801 registers, in the address generator 2109 in advance, VPI/VCI data for identification the connection and address transmission words used to transmit the ATM cells belonging to the connection. For example, the VPI/VCI data and the address transmission words registered by the microprocessor 1801 are held in the form of a table. Upon reception of the VPI/VCI data from the reception cell buffer 2107, the address generator 2109 searches this table for an address transmission word corresponding to the VPI/VCI data, and outputs the address transmission word to a second selector 2110. The reception cell buffer 2107 then sequentially outputs the currently held ATM cells to the second selector 2110 in the order in which they were held. The second selector 2110 sequentially outputs the address transmission words and the ATM cells to the second PCI bus segment 1813.

Information is communicated between the second PCI bus segment 1813 and the private area module in accordance with the PCI bus standards. The PCI protocol processor 2111 controls the timing of this communication. The PCI protocol processor 2111 controls the operation timings of the address decoder 2101, the first selector 2102, the ATM cell input port of the transmission cell buffer 2103, the ATM cell output port of the reception cell buffer 2107, the address generator 2109, and the second selector 2110 in accordance with the PCI bus standards.

The address decoder 2101, the first selector 2102, the transmission cell buffer 2103, the output interval generator 2104, the reception cell buffer 2107, the PCI request generator 2108, the address generator 2109, the second selector 2110, and the PCI protocol processor 2111 are functional sections required for transmission/reception of ATM cells to/from the second PCI bus segment 1813. These sections are encircled with the dotted line and referred to as a PCI bus access processor 2112. The PCI bus access processor 2112 is incorporated in other modules as well as the private area module 1809.

Although no shown in FIG. 11 for the sake of illustrative convenience, the private area module 1809 includes various types of registers to set the relationship between VPI/VCI data for the address generator 2109 and an address transmission word and set the band to be assigned to the output interval generator 2104. Data are read/written from/in these registers through the second PCI bus segment 1813. The PCI protocol processor 2111 performs timing control over this read/write operation. Modules other than the private area module include such control registers.

According to the connection form between the information box 1121 and each information drop section 1122-i in FIG. 6, the private area module 1809 needs to supply power for the operation of the information drop section 1122-i. For this purpose, an electric outlet 2113 is used.

2.2.7 Telephone Network Module

The detailed arrangement and operation of the telephone network module 1810 will be described next.

Figure 12:
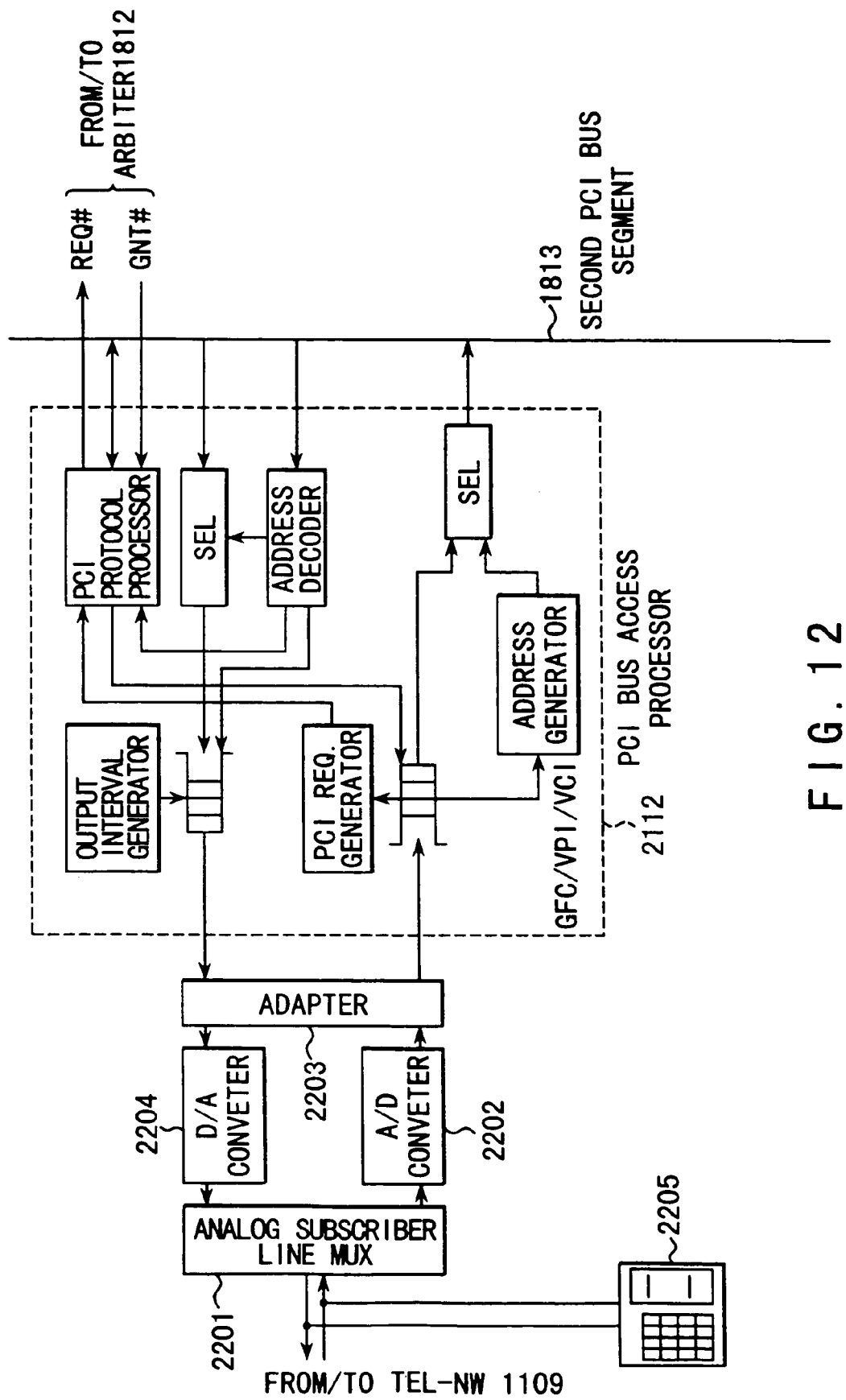
FIG. 12 is a block diagram showing an example of the arrangement of a telephone network (TEL-NET) module of the information box in FIG. 8.

FIG. 12 shows an example of the detailed arrangement of the telephone network module 1810. The telephone network module 1810 converts a speech/FAX signal sent as an analog signal through the telephone network 1109 into a digital ATM cell, and outputs the cell onto the second PCI bus segment 1813. The telephone network module 1810 converts a speech/FAX signal in the form of an ATM cell received from the second PCI bus segment 1813 into an analog signal, and outputs it to the telephone network 1109. The telephone network module 1810 also executes a connection setting protocol between the existing telephone network 1109 and the home network.

An analog signal input from the telephone network 1109 is supplied to an A/D converter 2202 through an analog subscriber line MUX 2201. The supplied analog signal is converted into a digital signal by the A/D converter 2202 and supplied to an adapter 2203. The adapter 2203 sequentially converts the bit strings supplied from the A/D converter 2202 into ATM cells according to a predetermined type of adaptation protocol, and supplies them to a PCI bus access processor 2112. The process of outputting the ATM cells onto the second PCI bus segment 1813 is the same as that performed by the PCI bus access processor 2112 of the private area module 1809.

The ATM cells output to the telephone network module 1810 on the second PCI bus segment 1813 are received by the PCI bus access processor 2112, as in the case of the private area module 1809, and transferred to the adapter 2203. Upon reception of the cells from the PCI bus access processor 2112, the adapter 2203 applies a predetermined type of adaptation protocol to the cells to convert them into continuous bit strings, and outputs them to a D/A converter 2204. The D/A converter 2204 converts the sequentially supplied bit strings into analog signals, and outputs them to the telephone network 1109 through the analog subscriber line MUX 2201.

The analog subscriber line MUX 2201 includes analog circuits required to connect digital circuits to the existing telephone network 1109. The analog subscriber line MUX 2201 detects an incoming call from the telephone network and executes a connection setting protocol for the telephone network 1109, e.g., transmission of a dial pulse/push button signal to the telephone network 1109.

Similar to the private area module described above, the microprocessor 1801 may perform various types of setting control over predetermined registers incorporated in the telephone network module 1810 by accessing messages on the PCI bus. In addition, the analog subscriber line MUX 2201 may generate an interrupt with respect to the microprocessor 1801 when, for example, an incoming call is received from the telephone network 1109.

2.2.8 CATV Module

Figure 13:
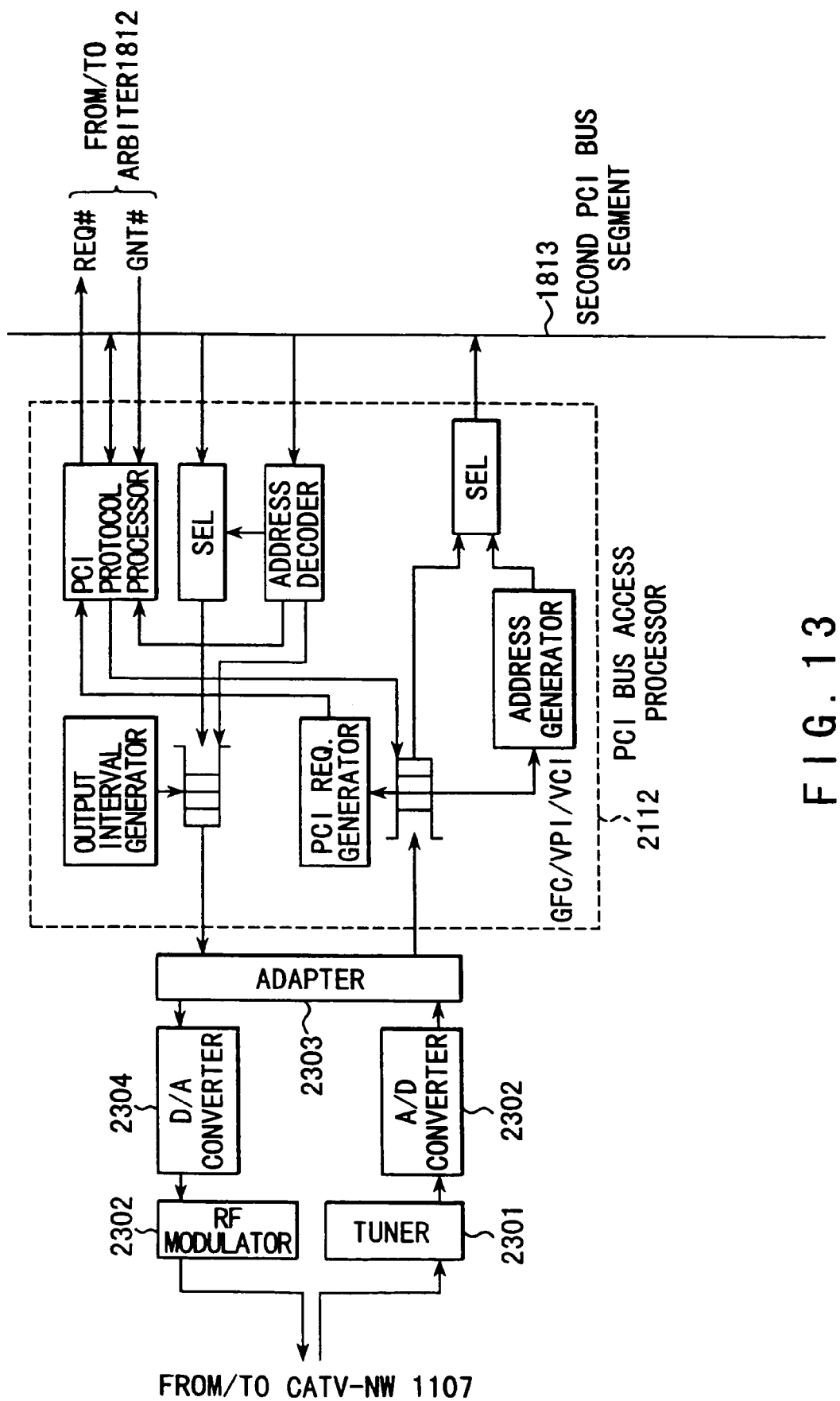
FIG. 13 is a block diagram showing an example of the arrangement of a CATV module of the information box in FIG. 8.

FIG. 13 shows an example of the detailed arrangement of the CATV module 1811. The CATV module 1811 selectively receives one of RF (radio frequency) signals from the CATV network 1107, and extracts an image/speech signal from the RF signal. The CATV module 1811 then converts the extracted signal into a digital ATM cell, and outputs it onto the second PCI bus segment 1813. The CATV module 1811 receives head-end information (e.g., a control command for fast forward/reverse/stop in a video on-demand service, or speech information in the CATV network 1107 for a speech communication service) for the CATV network 1107 from the second PCI bus segment 1813 in the form of an ATM cell, and outputs it as an RF signal. The CATV module 1811 also executes various control operations (e.g., channel selection of the tuner) required for transmission/reception of signals to/from the CATV network 1107.

The arrangement of the CATV module 1811 is the same as that of the arbiter 1812 except that the analog subscriber line MUX 2201 of the telephone network module 1810 is replaced with a tuner 2301 and an RF modulator 2302. In addition, the functions of the tuner 2301 and the RF modulator 2302 are the same as those in the prior art, and hence a description thereof will be omitted.

2.3 Network Synchronization

Network synchronization of the home network formed by connecting one or a plurality of information drop sections 1122-*i* to the information box 1121 will be described next.

Network synchronization is an operation required to cause the respective communication apparatuses in the home network to output the same number of bits within a predetermined period of time. If the network operates without establishing network synchronization, the number of bits of information output from a given communication apparatus greatly differs from the number of bits processed by a communication apparatus which receives the information output from the given communication apparatus in a long period of time. As a result, an elastic buffer constituting an external data receiving section arranged in the communication apparatus on the reception side may overflow or underflow. For this reason, a frame step-out may periodically occur, or the frames of a movie may be disturbed while the user is enjoying it. In order to solve this problem, the frequency of the operation clocks for each communication apparatus is generally matched with the frequency of clocks which can be extracted from bit strings received from a public network (each communication apparatus is slave-synchronized with the public network). This operation is called network synchronization. In order to realize such network, PLLs (phase-locked loops) are generally used. However, in order to realize slave synchronization of each communication apparatus connected to the home network with respect to the public network by using the PLLs, the PLLs must have a high-cost function. In addition, after clocks pass through many PLLs, the frequency of the clocks greatly varies. For this reason, this scheme is not suited for the home network. According to the present invention, therefore, the ATM physical layer operates in the independent synchronization mode on the physical link of the home network. More specifically, external data is written in the elastic buffer of each communication apparatus connected to the home network in synchronism with clocks extracted from an external bit string. However, data is read out from the elastic buffer of each communication apparatus in synchronism with system clocks generated by each communication apparatus. The use of this scheme solves the problem that the frequency of clocks greatly varies after they pass through many PLLs. In addition, the function of PLLs to be used can be suppressed low, and hence the cost of each home communication apparatus can be greatly reduced.

When each communication apparatus is to operate in the independent synchronization mode, some measures must be taken to prevent the elastic buffer of each communication apparatus from underflowing or overflowing. An asynchronous transmission type physical layer using ATM cells with preambles is used, as in Ethernet or the like, to perform ATM communication between the information apparatuses connected to the home network according to the present invention. In the case of the asynchronous transmission type physical layer, any special measures for normal operation need not be taken for the physical layer itself. According to the asynchronous transmission type physical layer, the first ATM cell is detected by using a preamble, and at the same time, a clock is extracted from the preamble to write the ATM cell in the elastic buffer. Such clocks are extracted in units of received ATM cells. Every time an ATM cell is received, the system clock for the apparatus on the reception side follows the system clock on the apparatus on the transmission side.

The operation of each information drop section 1122-*i* in a case in which the home network is operated on the basis of the above assumption will be described again with reference to FIGS. 3A and 3B. In the transmission line decoders 13011, 13012, 13013, and 13014 (including the elastic buffers) connected to the two information transmission ports and the two information drop ports of each information drop section 1122-*i*, the bit strings, of ATM cells received through the respective ports, which follow the preambles are written in the respective elastic buffers in synchronism with clocks extracted from the preambles of the ATM cells. A series of operations of reading out an ATM cell from the elastic buffer, and guiding the valid cell to a desired port, or outputting it from one of the transmission line encoders 13021, 13022, 13023, and 13024 is performed in synchronism with the clocks generated by the information drop section 1122-*i* itself. The clocks generated by the information drop section 1122-*i* itself are independent of any clocks extracted by the transmission line decoders 13011, 13012, 13013, and 13014. That is, the information drop section 1122-*i* operates in the independent synchronization mode.

The timing of reading out an ATM cell from the elastic buffer is synchronous with a cell slot generated on the basis of the system clocks generated by the information drop section 1122-*i* itself. A communication apparatus outputs an ATM cell to the information drop section 1122-*i* in synchronism with a cell slot generated on the basis of the system clocks generated by the apparatus itself. For this reason, the number of cell slots generated inside the information drop section 1122-*i* may greatly differ from the number of ATM cells output from another communication apparatus in a long period of time. In this state, the elastic buffer of the information drop section 1122-*i* of interest underflows or overflows. In order to prevent this, the information drop section 1122-*i* of interest must make the number of cells read out from the elastic buffer equal to the number of cells received.

For example, the numbers of ATM cells input/output through the input/output terminals of the respective communication apparatuses connected to the home network are preferably made equal throughout the home network in a long period of time by the following method. Each communication apparatus independently performs the same operation to make the numbers of ATM cells output from all the communication apparatuses equal in a long period of time. In the home network according to the present invention, a tree structure is constituted by the information drop sections 1122-*i* with the information box 1121 serving as the root. Each information drop section 1122-*i* connected to the information box 1121 matches the number of ATM cells output from the section itself with the number of ATM cells received from the information box 1121, whereas the information drop section 1122-*j* connected to the information drop section 1122-*i* matches the number of ATM cells output from the section 1122-*j* itself with the number of ATM cells received from the information drop section 1122-*i*. Similarly, each information drop section 1122-*k* matches the number of ATM cells output from the section itself with the number of ATM cells received from the information apparatus connected to the higher order side. With this operation, the numbers of ATM cells input/output through the input/output terminals of the respective communication apparatuses can be made equal throughout the overall home network.

When, for example, the information drop section 1122-*i* (the information drop section 1507 in FIG. 6) in FIG. 4 is connected to the information box 1121 through another information drop section 1122-*i* (the information drop section 1504 in FIG. 6) as shown in FIG. 6, the information transmission port linked with the AC plug 1405 in FIG. 4 is connected to the information drop section 1504. If, therefore, the information drop section 1507 is designed to match the number of cells input through the information transmission port with the number of cells output from all the output terminals, the numbers of ATM cells input/output through the input/output terminals of all the communication apparatuses constituting the home network can be made equal.

If the information drop section 1122-*i* is designed to match the number of ATM cells input through input terminals other than the information transmission port linked with the AC plug 1405 with the number of ATM cells input through the information transmission port linked with the AC plug 1405, the timing design of the information drop section 1122-*i* is facilitated. According to the present invention, the information drop section 1122-*i* includes the cell counter 1304 (see FIGS. 3A and 3B) to realize this function. The method of matching the number of ATM cells input through the information transmission port linked with the AC plug 1405 directly connected to the high level information apparatus with the number of ATM cells input through each of the remaining input terminals and with the number of ATM cells output from all the output terminals will be described in detail again with reference to FIGS. 3A and 3B. Assume that the information transmission port A is linked with the AC plug 1405.

The cell counter 1304 counts the number of ATM cells written in the elastic buffer of the transmission line decoder 13011 connected to the information transmission port A of the information drop section 1122-*i* and the number of cell slots generated by the information drop section itself, and compares them. If the number of ATM cells written in the elastic buffer is larger than the number of cell slots generated by the information drop section of interest, it indicates that the cell slot period of the high level communication apparatus is shorter than the cell slot period of the information drop section of interest. If the number of ATM cells written in the elastic buffer is smaller than the number of cell slots generated by the information drop section of interest, it indicates that the cell slot period of the high level communication apparatus is longer than the cell slot period of the information drop section of interest. In the former case, the cell slot period of the information drop section of interest must be shortened.

In the latter case, the cell slot period of the information drop section of interest must be prolonged. In order to perform such an operation, the information drop section 1122-*i* sets an interval between ATM cells to be transmitted (in other words, an interval between cell slots to be generated), and properly changes the interval to adjust the cell slot period. More specifically, when the number of ATM cells written in the elastic buffer becomes larger than the number of cell slots generated by the information drop section of interest by a predetermined value (i.e., the cell slot period of the high level information apparatus becomes shorter), the interval is shortened by a predetermined value, and the number of ATM cells written in the elastic buffer and the number of cell slots generated by the information drop section itself are cleared. When the number of ATM cells written in the elastic buffer becomes smaller than the number of cell slots generated by the information drop section of interest by a predetermined value (i.e., the cell slot period of the high level information apparatus becomes longer), the interval is prolonged by a predetermined value, and the number of ATM cells written in the elastic buffer and the number of cell slots generated by the information drop section itself are cleared. By controlling the interval between cell slots in this manner, the average cell slot period of the information drop section connected to the lower order side can be made equal to the average cell slot period of the high level information apparatus (the information box or the information drop section). In addition, the average numbers of times ATM cells are read from and written in the elastic buffer of the transmission line decoder 13011 connected to the information transmission port linked with the AC plug 1405 can be made equal to each other, thereby preventing the elastic buffer from overflowing and underflowing.

On the asynchronous transmission type physical layer, the interval between cell slots is directly reflected on the interval between ATM cells output onto the physical link. The cell counter 1304 counts the numbers of ATM cells written in the elastic buffers of the transmission line decoders 13011 and 13012 connected to the information transmission ports A and B of the information drop section 1122-*i* and in the elastic buffers of the transmission line decoders 13013 and 13014 connected to the information drop ports A and B, and controls the number of empty cells on the basis of the result obtained by comparing the respective count values. If the number of ATM cells written in the elastic buffer of each of the transmission line decoders 13012, 13013, and 13014 is larger than the number of ATM cells written in the elastic buffer of the transmission line decoder 13011, the cell counter 1304 inhibits writing of empty cells in the elastic buffers of the transmission line decoders 13012, 13013, and 13014, thereby making the numbers of ATM cells held in the respective buffers equal to each other. If the number of ATM cells written in the elastic buffer of each of the transmission line decoders 13012, 13013, and 13014 is smaller than the number of ATM cells written in the elastic buffer of the transmission line decoder 13011, the cell counter 1304 writes empty cells in the elastic buffers of the transmission line decoders 13012, 13013, and 13014, thereby making the numbers of ATM cells held in the respective buffers equal to each other.

With this operation, the number of ATM cells input through the input terminal of the information drop port A can be matched with the number of ATM cells input through each of the remaining input terminals. In addition, even if ATM cells are read out from the elastic buffers of the transmission line decoders 13012, 13013, and 13014 in cell slots whose interval is controlled in accordance with the number of ATM cells input through the information transmission port A, the average numbers of times ATM cells are written in and read out from these elastic buffers can be made equal, thereby simplifying the logic design of each information drop section 1122-$i$.

In order to reliably prevent each elastic buffer from underflowing and overflowing by adjusting the interval between cell slots and empty cell write control, the length of the elastic buffer, the difference between the count values of the two counters serving as triggers for adjustment of the interval, and the amount of change in interval must be properly set in accordance with the frequency precision of clocks generated by each communication apparatus connected to the home network. Before inhibiting writing of empty cells in a given elastic buffer, the cell counter 1304 may check whether a predetermined number of ATM cells are held in the elastic buffer. The cell counter 1304 inhibits writing of empty cells upon this check. Before writing empty cells in a given elastic buffer, the cell counter 1304 may check whether the elastic buffer has an available area in which a predetermined number of ATM cells can be written. The cell counter 1304 writes the empty cells upon the check.

Assume that the physical layer between communication apparatuses connected to the home network according to the present invention is a synchronous transmission type physical layer like SONET (in which an ATM cell is written following a payload portion in a frame defined on the physical link to perform communication). Even in this case, network synchronization is performed basically in the same manner as in the case of the above asynchronous transmission type physical layer. The system using the asynchronous transmission type ATM physical layer differs from the system using the synchronous transmission type ATM physical layer in the manner of absorbing a frequency difference. More specifically, in the system using asynchronous transmission type ATM physical layer, the system clock frequency difference between communication apparatuses is finally absorbed by changing the interval between ATM cells on the physical link. In the system using synchronous transmission type ATM physical layer, the system clock frequency difference between communication apparatuses is absorbed by adjusting the length of the overhead of a frame (pulse stuffing).

As shown in FIG. 4, since the information drop section 1122-$i$ is designed such that the AC plug 1403 and the information transmission port are arranged in a one-to-one correspondence, the power source and the ATM cell source are the same information apparatus. If no power is supplied through the AC plug 1403 of the information drop section 1122-$i$, the information drop section and the information apparatus connected to the lower order side cannot be operated. For this reason, the information drop section 1122-$i$ is slave-synchronized with the high level information apparatus connected to the information transmission port linked with the AC plug 1403. If no ATM cell is supplied from the information transmission port linked with the AC plug 1502 to an information drop section like the information drop section 1504 in FIG. 5 while power is supplied from the AC plug 1502, the number of ATM cells input/output to/from each of the remaining communication apparatuses is matched with the number of ATM cells output from the information drop section 1504. In addition, since the power source and the ATM cell source are the same information apparatus, the network synchronization route does not loop, and the home network can stably operate.

On a layer (AAL1 of the ITU-T standards) higher in level than the AAL (ATM adaptation layer) of ATM, clock synchronization between terminals can be realized by an adaptation protocol for transmitting continuous information. That is, by using this protocol, clock synchronization associated with ATM cell transmission between a transmission terminal and a reception terminal can be established, and overflowing/underflowing of the elastic buffer of the reception terminal can be prevented in processing on a layer higher in level than the AAL. According to the present invention, the adapters 2203 and 2303 included in modules such as the telephone network module 1810 or the CATV module 1811 of the information box 1121 can be regarded as transmission and reception terminals on the AAL1. For this reason, by establishing clock synchronization between the respective modules, each module on the reception terminal side can reliably perform slave synchronization with a received bit stream even when each module is to communicate with the public network while receiving a TV program with ground/satellite waves.

2.4 NTSC Encoder/Decoder

FIG. 14 shows an example of the arrangement of each of the NTSC encoders•decoders 11231, 11232, and 11233 in FIGS. 1A and 1B. Each of the NTSC encoders•decoders 11231, 11232, and 11233 converts speech/image information supplied as an ATM cell from the information drop section 1122-$i$ into an analog speech/image signal, and outputs it. Each of the NTSC encoders•decoders 11231, 11232, and 11233 converts a supplied analog speech/image signal into a digital ATM cell, and outputs it to the information drop section 1122-$i$.

A bit string input from the information drop section 1122-$i$ is supplied first to a transmission line encoder 2401. The transmission line encoder 2401 reproduces an ATM cell flow from the supplied bit string, and outputs the cell flow to a. VCI filter 2402. The VCI filter 2402 refers to the VPI/VCI data of the supplied ATM cell flow to filter the flow, and transmits, to a first receiver FIFO 2403, an ATM cell having VPI/VCI data for the connection set to transmit the speech/image information, and also transmits, to a second receiver FIFO 2404, an ATM cell having VPI/VCI data for the connection set to control the NTSC encoder•decoder. The transmission line encoder 2401 discards ATM cells having other VPI/VCI data. The ATM cell received by the first receiver FIFO 2403 is read out by an adapter (reassembly) 2405. The adapter (reassembly) 2405 generates digital speech information and digital image information in a synchronized state from the ATM cell. The adapter 2405 then outputs the digital speech information to a D/A converter 2406, and the digital image information to an image decompression section 2407. Upon reception of the digital speech information, the D/A converter 2406 generates an analog speech signal from the digital information, and outputs the signal to a predetermined AVI apparatus. As is apparent, each NTSC encoder•decoder may incorporate an audio amplifier 2408 and a speaker 2409 to amplify the analog signal output from the D/A converter 2406 and generate a sound. Upon reception of the digital image signal output from the adapter (assembly) 2405, the image decompression section 2407 generates an analog image signal from this digital signal, and outputs the image signal to the predetermined AVI apparatus.

The speech and image signals output from the predetermined AVI apparatus are respectively supplied to an A/D converter 2410 and an image compression section 2411. The A/D converter 2410 converts the supplied speech signal into a digital bit stream, and outputs it to an adapter (segmentation) 2412. The image compression section 2411 converts the supplied image signal into a digital bit stream, and outputs it to the adapter (segmentation) 2412. The adapter (segmentation) 2412 converts the supplied speech and image bit streams into ATM cells, and outputs them to a transmitter FIFO 2413. The transmitter FIFO 2413 sequentially transmits the valid cells received from the adapter (segmentation) 2412 at predetermined intervals. In this case, empty cells are transmitted to the transmission line encoder 2414 in the cell slots in which no valid cells are transmitted. The transmission line encoder 2414 converts the received ATM cells into data in the format on the transmission line, and outputs the data to the information drop section 1122-i.

Each NTSC encoder•decoder may be designed such that the numbers of ATM cells transmitted are made equal in a long period of time by performing independent synchronization on the physical layer and properly changing the interval between cell slots on the ATM layer, and operations on the higher level layers are performed in accordance with the adaptation protocol, thereby establishing network synchronization. In order to realize this, a cell counter 2415 is connected to the transmission line encoder 2401.

A controller 2416 is constituted by a microprocessor having a relatively low ability such as Z80. The controller 2416 controls the respective sections described above, and sets VPI/VCI data for connection on each NTSC encoder•decoder (the VCI filter 2402 and the adapter (segmentation) 2412 are notified of this data). The controller 2416 also requests the home network to perform connection setting instead of the existing AVI apparatuses connected to the NTSC encoders•decoders 11231, 11232, and 11233, or responds to connection setting from the home network. Connection setting from an existing AVI apparatus may be controlled with a remote controller attached to the AVI apparatus. When connection setting is performed for an existing AVI apparatus, the AVI apparatus may be controlled from the home network by transmitting a signal output from the remote controller to the controller 2416. For this purpose, an infrared receiver 2419 and an infrared transmitter 2420 are connected to the controller 2416.

Assume that connection setting on the home network is performed by the method using broadcast cells and disclosed in Jpn. Pat. Appln. KOKAI Publication No. 6-311180 filed by the present inventor. In this case, the controller 2416 must load cells, of broadcast cells, which are addressed to the controller itself. For this reason, the controller 2416 needs to recognize the node number assigned thereto. This node number may be written in a serial ROM 2417 in advance. At start-up, the controller 2416 reads out the node number from the serial ROM 2417 and notifies the VCI filter 2402 of the node number. Upon reception of an ATM cell from the transmission line encoder 2401, the VCI filter 2402 checks on the basis of the VPI/VCI data of the ATM cell whether the cell is a broadcast cell. If the ATM cell is a broadcast cell, the VCI filter 2402 refers to the address field to transfer, to the second receiver FIFO 2404, the broadcast cell having the node number supplied from the controller 2416 as the destination address. The controller 2416 polls the second receiver FIFO 2404 at a predetermined period. If an ATM cell is held in the second receiver FIFO 2404, the controller 2416 loads the ATM cell, and sequentially performs the operation designated by the ATM cell, thereby coping with connection setting from the home network.

2.5 Connection of Personal Computer

Figure 15:
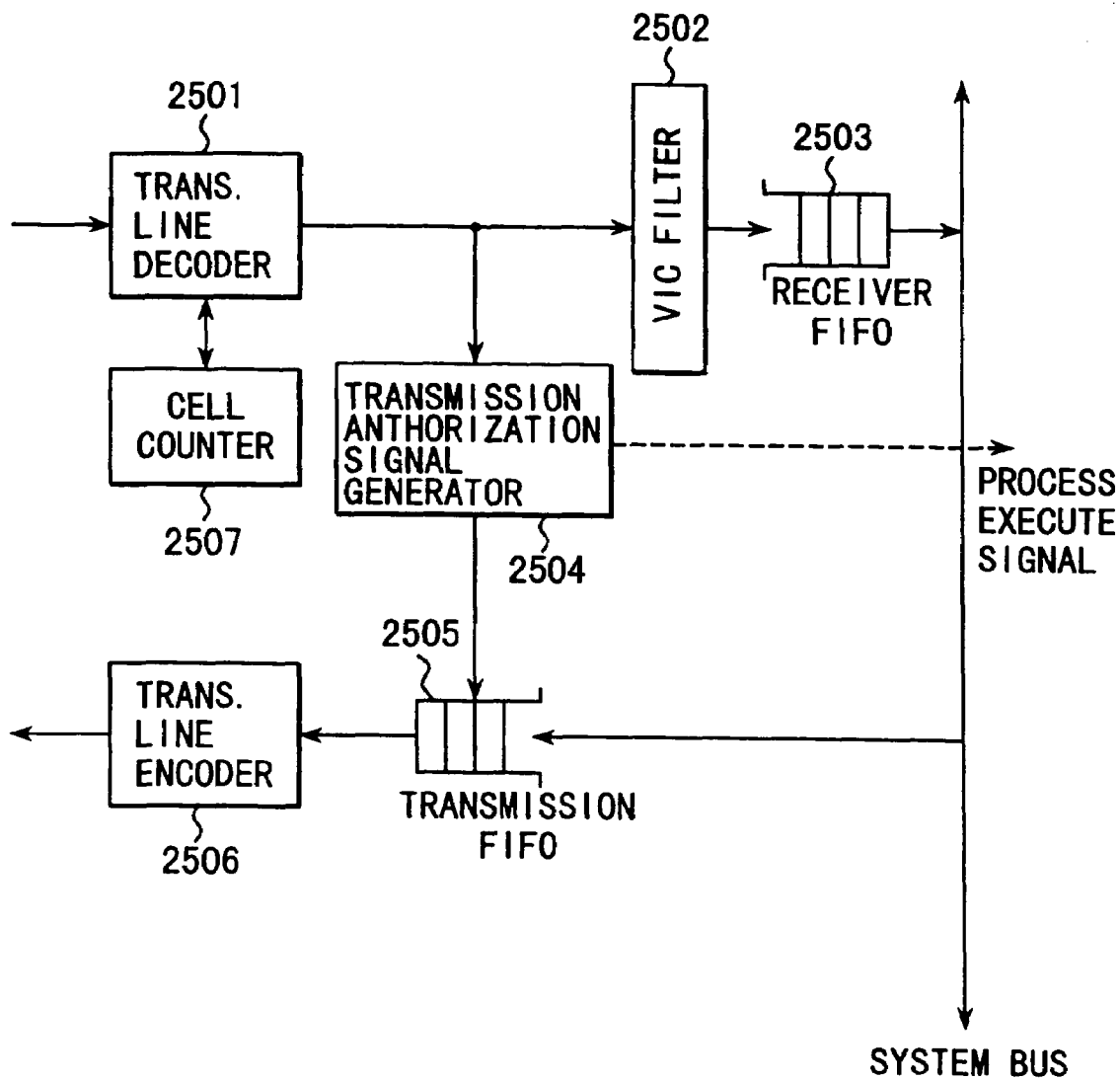
FIG. 15 is a block diagram showing an example of the arrangement of an adapter for connecting a personal computer to the home network according to the embodiment.

The personal computer 1111 provides the home network with various sophisticated services (e.g., various media conversions (e.g., extraction of character information from image information supplied as bitmap information), video data editing, and formation and reading of multimedia mail). FIG. 15 shows an example of the arrangement of an adapter used to connect the personal computer 1111 to the information drop section 1122-i. For example, this adapter is inserted in a system bus such as a PCI or ISA bus inside the personal computer.

When a bit string supplied from the home network is input to a transmission line decoder 2501, the bit string is output as a cell flow to a VCI filter 2502. The VCI filter 2502 extracts ATM cells having the VPI/VCI data assigned to the connection set on the personal computer 1111 from the input cell flow by filtering it, and writes the ATM cells in a receiver FIFO 2503. The receiver FIFO 2503 writes the written ATM cells in the buffer area (not shown) of the main memory (not shown) of the personal computer 1111 through the system bus. The process executed on the personal computer 1111 may access the buffer area to read out the ATM cells required for the execution, perform adaption suited for the execution, and convert the cells into data in the required format.

Consider the process on the personal computer 1111 which is executed to transmit ATM cells to the home network. First of all, this process writes the ATM cells to be transmitted in the buffer area (not shown) of the main memory (not shown) of the personal computer 1111, and instructs a DMA transfer functional section (not shown) to transmit the ATM cells to a transmitter FIFO 2505. The transmitter FIFO 2505 temporarily holds the ATM cells transferred from the DMA transfer functional section (not shown). A transmission authorization signal generator 2504 counts the number of ATM cells output from the transmission line decoder 2501, and monitors a cell arrival interval and cell arrival times on the basis of this count value. The transmission authorization signal generator 2504 then sequentially calculates estimated arrival times (TATs) corresponding to the bands assigned to the connections set by the personal computer 1111 on the basis of the above monitored data in units of connections. In the cell slots in which the TATs coincide with the actual cell arrival times, the transmission authorization signal generator 2504 instructs the transmitter FIFO 2505 to transmit the valid cells in units of connections. The transmitter FIFO 2505 transmits the ATM cells belonging to the connections designated by the transmission authorization signal generator 2504 to a transmission line encoder 2506. If there is no ATM cell (to be transmitted) belonging to any of the designated connections, the VCI filter 2502 may transmit an empty cell. In a cell slot in which the transmission authorization signal generator 2504 outputs no valid cell transmission instruction, the VCI filter 2502 transmits an empty cell to the transmission line encoder 2506.

The TATs generated by the arbiter 1812 for the second PCI bus segment 1813 of the information box 1121 are generated in units of modules, i.e., physical links. In contrast to this, the transmission authorization signal generator 2504 of the personal computer 1111 generates TATs in units of connections. The following is the reason. The second PCI bus segment 1813 of the information box 1121 relays ATM cells in units of connections which are expected to maintain the bands. In contrast to this, the personal computer 1111 simply lets ATM cells flow in the connections (owing to program errors and the like, the ATM cells generated by the personal computer 1111 are not necessarily output while the assigned bands are maintained).

3. Integrated Control Over Home Network

Integrated control over the home network shown in FIGS. 1A and 1B will be described next.

3.1 Specifications Required for Integrated Control over Home Network

With the use of the home network shown in FIGS. 1A and 1B, information in a given information apparatus can be transferred to another information apparatus to be processed somehow. When, for example, a TV program supplied to the home through the CATV network 1107 is to be enjoyed through the TV set 1117, the following operation is performed in the home network. The TV program received by the CATV module 1811 of the information box 1121 is converted into digital ATM cells. The ATM cells are then output from the information box 1121 through the second PCI bus segment 1813 and the private area module 1809. The ATM cells reach the NTSC encoder•decoder 11232 through the information drop sections 1122-3 and 1122-4. Each digital signal of the TV program is converted into an ATM cell. This ATM cell is converted into an analog signal by the NTSC encoder•decoder 11232 and output to the TV set 1117. As a result, the TV program is displayed on the TV set 1117. That is, the TV program information held in the information box 1121 is moved to the TV set 1117 to be displayed thereon. In this case, control performed over the communication apparatuses on the home network to execute such a series of operations in a seamless manner will be referred to as integrated control.

In order to realize integrated control over the home network, the functional section for this integrated control must recognize the types and functions of all the communication apparatuses constituting the home network.

Many current operating systems for personal computers have graphical user interfaces called GUIs. A user interface is used to display information files and programs for executing predetermined processes for the information files on the screen in the form of icons. The user can cause the personal computer to execute a desired process by only selecting and designating an icon with a mouse serving as a pointing device. When, for example, the user selects a given icon with the mouse and drags/drops the icon onto another icon, the function linked with the latter icon is started to process the information file linked with the former icon. In the home network designed for home use, the integrated control functional section is preferably instructed/operated by using the operation method using such a GUI that allows the user to intuitively operate the computer. In addition, in the home network designed for home use, the cumbersome operation required for the construction of a network should be minimized. For example, it is preferable that the user can receive services provided by a module as soon as the module is inserted into the information box 1121. The following are the specifications required for the functional section for integrated control over the home network according to the present invention:

When communication apparatuses (including AVI apparatuses) are connected to the information drop sections 1122-i, the functions of these apparatuses (e.g., the function of broadcasting a TV program to the home network, the function of storing a large amount of digital data, the function of displaying digital data on the screen, and the function of performing character recognition with respect to an image supplied as digital data, and converting the recognized characters into character information) are automatically registered in the functional section for integrated control over the home network (automatic registration function).

The information held in the home network or broadcast information is automatically registered in the functional section for integrated control over the home network (automatic information registration function).

Registered functions and information are presented to the user to facilitate selection of information and functions and designation of operations for the selected information (function-information linking function).

Dragging/dropping of an icon indicating information onto an icon indicating a given function is a method of realizing the function-information linking function.

3.2 Function-Information Linking Function

Of the above three functions of the functional section for integrated control over the home network, the function-information linking function will be described next.

Figure 16:
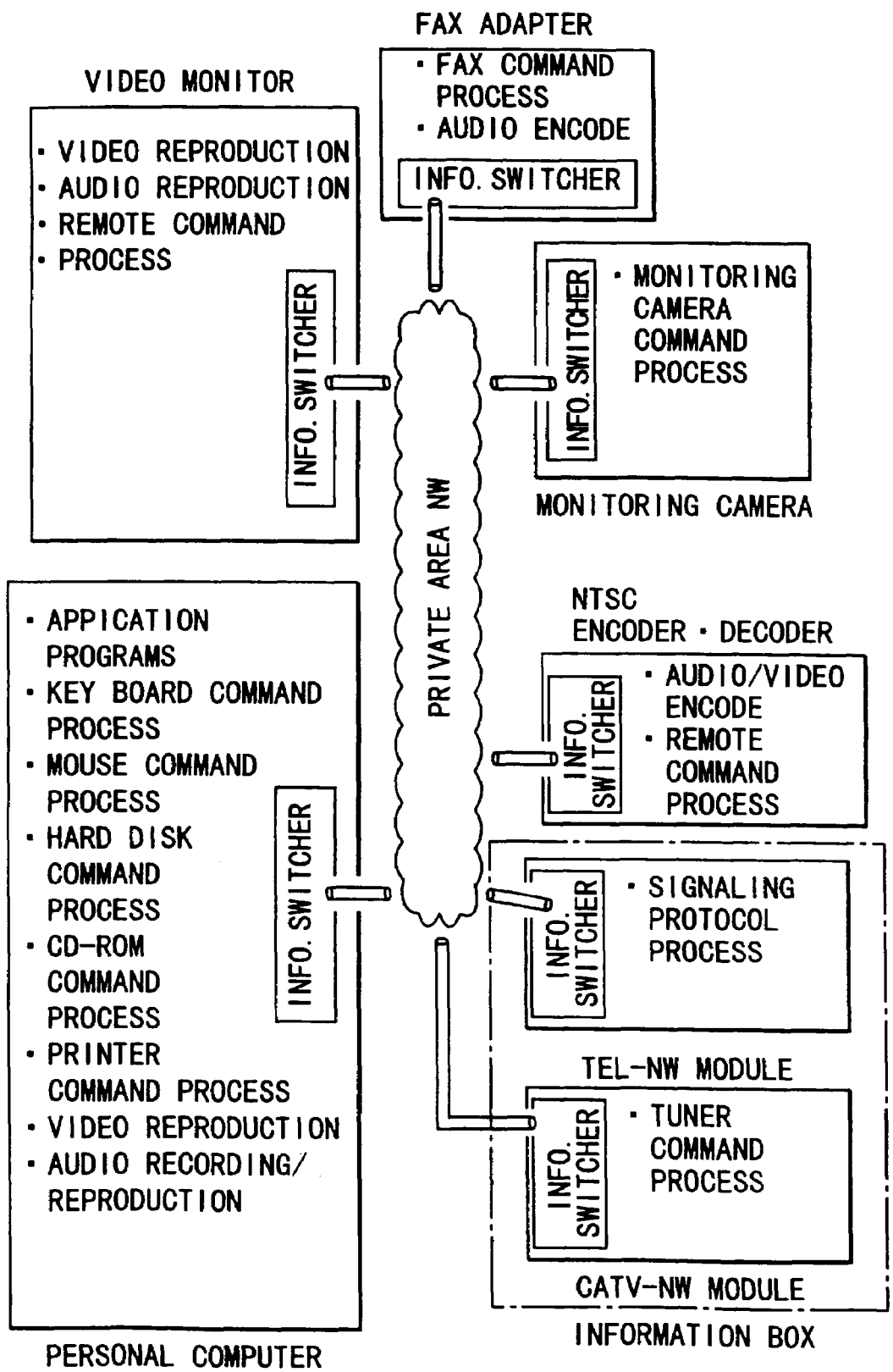
FIG. 16 is a block diagram for explaining the operations of the information switches incorporated in all the information apparatuses connected to the home network according to the embodiment.

As shown in FIG. 16, the information apparatuses (e.g., modules such as a telephone network module and a CATV module in the information box and information apparatus, other than the information drop sections, which are connected to the information drop sections) connected to the home network according to the present invention have information switchers. Each information switcher has the following functions:

generating an index indicating the functions and information that the information apparatus can provide for other information apparatuses (i.e., function/information index), and outputting it to the home network, as needed;

acquiring the function/information indexes generated by other information apparatuses connected to the home network when the user is to perform a function-information linking operation;

presenting the function/information indexes acquired from other information apparatuses to the user; and setting a required information communication path on the basis of information contained in the information index when the user performs a function-information linking operation with respect to the presented index, and connecting the information communication path to a process when the process is started by the information switchers of two information apparatuses linked with each other upon function-information linking operation based on the information contained in the function index.

More specifically, the function/information index generated by the information switcher is a combination of pieces of bitmap information or character information indicating the functions and information that the information apparatus having the information switcher has and pointers to the entities of the functions and information. For example, the pieces of bitmap information or character information indicating the functions and information and contained in the function/information index are displayed as icons on a predetermined display screen such as the screen of a personal computer to allow the user to perform a drag/drop operation with the mouse. For example, on a TV set which does not allow the user to perform a drag/drop operation with the mouse, only character information or a combination of bitmap information and character information is displayed in the form of a menu. The pointers to the entities of the functions and information, which are contained in the function/information index, character strings each having a predetermined length, including an identifier (apparatus identifier) identifying the information apparatus which has generated the index and used in the home network, identifiers (function identifiers) identifying the functions which can be provided for other information apparatuses, and identifiers (information identifiers) identifying pieces of information. If the home network of the present invention controls the ATM layer by using the method disclosed in Jpn. Pat. Appln. KOKAI Publication No. 6-311180 filed by the present inventor, the node numbers used in the method can be used as the apparatus identifiers of the respective information apparatuses. In addition, function and information identifiers in each information apparatus may be provided by itself. That is, the structures of identifiers in information apparatuses need not be consistent.

3.3 Operation of Information Switcher

The operation of the information switcher will be described next, assuming that the user is to enjoy a CATV broadcast on a personal computer or a TV set. In enjoying information, present in the home network, on a personal computer or a TV set, first of all, the user notifies the information switcher of the personal computer or the TV set of his/her intention. If the personal computer is used, the user may double-click on an icon corresponding to the information switcher to call the information switcher, thereby notifying his/her intention. If the TV set is to be used, the user may input a predetermined channel number with a remote controller. Alternatively, the remote controller may be provided with an information switcher call key to allow the user to call the information switcher by depressing the key. When the information switcher is started by the user, the information switcher outputs a function/information index request message to the home network, and then acquires the function/information indexes associated with all the apparatuses connected to the home network. Upon reception of the function/information index request message, the information switcher of each information apparatus connected to the home network outputs an index of functions and information which can be provided for other information apparatuses together with a function/information index response message. The information switcher which has output the function/information index request message receives the function/information index response messages output from other information switchers, and obtains indexes of the functions and information which are present in the home network. Since the information switcher acquires the functions and information which are present in the home network as needed (in accordance with an instruction from the user), the user can search for functions or information present in the home network from all the information apparatuses connected thereto, thereby maintaining the consistent state of the home network.

When the information switcher searches for function/information with respect to the information apparatuses connected to the home network in accordance with an instruction from the user, the traffic in the home network increases, and the operating speed decreases in proportion to the propagation delay of a message because of the wait time for a response from each information apparatus. In the home network, however, the number of terminals subjected to a function-information linking operation at the same time is two or three at most, and messages can be exchanged between the communication apparatuses within the home network at a sufficiently high speed. It should be noted that the home network provides communication on a broadcast basis. The information switcher can easily acquire information from all the information apparatuses connected to the home network by connectionless communication on the network on a broadcast basis. In the home network of the present invention, a band is reserved for this communication. This connectionless communication may be realized by using an adaptation protocol, such as AAL (ATM adaptation layer) type 3/4, which is capable of multiplexing connectionless messages on predetermined VPI/VCI data.

Upon reception of the function/information index response messages from all the information apparatuses connected to the home network, the information switcher which has output the function/information index request message presents the received information to the user. The home network shown in FIG. 16 includes an information switcher linked with a FAX, an information switcher linked with a monitoring camera, an information switcher linked with an NTSC encoder•decoder, an information switcher linked with a telephone network module, an information switcher linked with a CATV module, an information switcher linked with a personal computer, and an information switcher linked with a video monitor. For example, these information switchers output the following indexes of information/functions which can be provided for other information apparatuses as function/information index response messages to the home network. Assume that the NTSC encoder•decoder controls the existing VTR using infrared signals.

Information Switcher Linked with FAX:
    function index: main power supply ON/OFF function, dial information input keypad function, and original receiving function
    information index: telephone number table Information Switcher Linked with Monitoring Camera:
    function index: main power supply ON/OFF function, and camera position moving function
    information index: monitoring image Information Switcher Linked with NTSC Encoder•Decoder:
    function index: main power supply ON/OFF function, reception channel selection function, fast-forward play function, rewind function, and recording function
    information index: tape (if existing VTR notifies that video tape is inserted)

Information Switcher Linked with Telephone Network Module:
    function index: originating function, and terminating function
    information index: information from/to telephone network module (after connection setting)

Information Switcher Linked with CATV Module:
    function index: main power supply ON/OFF function and CATV channel selection function
    information index: program (after channel selection)

Information Switcher Linked with Personal Computer:
    function index: applications (e.g., video display function and speech communication function) for realizing built-in functions using home network
    information index: information files associated with applications for realizing built-in functions using home network Information Switcher Linked with Video Monitor:
    function index: main power supply ON/OFF function and video display function
    information index: (no information to be presented)

Each information switcher outputs all or some of the above predetermined function/information indexes to the home network in accordance with the operation state of the apparatus upon reception of a function/information index request message. Assume that the information switcher linked with the CATV module receives a function/information index request message when the main power supply is in the OFF state. In this case, the information switcher outputs only the function index associated with the main power supply ON/OFF function to the home network. When the main power supply is in the ON state but no reception channel is selected, the information switcher outputs the function indexes associated with the main power supply ON/OFF function and the channel selection function to the home network. When the main power supply is in the ON state and a reception channel is selected, the information switcher outputs the function indexes associated with the main power supply ON/OFF function and the channel selection function, and the information index associated with programs.

The user selects the "main power supply ON/OFF" function index from the CATV module function/information index icons or menu displayed on, for example, the screen of the personal computer or the video monitor. The information switcher linked with the personal computer or the video monitor then obtains the apparatus identifier of the CATV module inside the home network and the function identifier of the selected function (main power supply ON/OFF function) which are contained in the selected CATV module function index. The information switcher outputs the selected function identifier to the apparatus indicated by the apparatus identifier inside the home network, i.e., the CATV module, through the connectionless communication channel which has been used to exchange function/information index request/response messages. When the CATV module receives the function identifier of the function (main power supply ON/OFF function) of the module itself, the module executes the operation designated by the function identifier. That is, the power supply of the CATV module is turned on. It should be noted that the information switcher linked with the personal computer or the video monitor does not recognize the meaning of the information contained in the information index. The information switcher linked with the personal computer or the video monitor simply presents the bitmap data and character data contained in the received function/information indexes to the user in the form of icons or a menu, and outputs the function/information identifiers to the apparatus designated by the apparatus identifier contained in the function/information indexes selected by the user. The user then recognizes specific operations to be performed as a result of selection of the function/information indexes on the basis of the bitmap data and/or character data contained in the function/information indexes.

When the main power supply of the CATV module is turned on, the CATV module outputs the function index associated with channel selection to the home network. Upon reception of the function index associated with channel selection from the CATV module, the information switcher linked with the personal computer or the video monitor newly displays the bitmap information and character information which are contained in the function index on the screen of the personal computer or the video monitor in the form of icons or a menu. In this state, the user can select a desired "channel selection" function index. When the "channel selection" function index is selected by the user, the information switcher outputs the function identifier of the "channel selection" function to the information apparatus indicated by the apparatus identifier contained in the function index, i.e., the CATV module. Thereafter, the user must actually select a channel. This channel selection may be performed as follows. For example, upon reception of the function index associated with channel selection, the CATV module outputs, to the home network, the information indexes corresponding to the respective channels that the module itself can receive. The personal computer or the video monitor receives the information indexes to allow the user to select the information index corresponding to the desired channel in the same manner as described above. Alternatively, the CATV module opens a new window on the personal computer or the video monitor, and the data required for the CATV module to execute a channel selection program are input/output (the channels which can be selected are presented, and channel designation information is input from the user in this case) on the new window. When channel selection is completed by one of the two operations described above, the information index indicating the program to be provided through the selected channel is output from the CATV module. Upon reception of this information index, the information switcher linked with the personal computer or the video monitor presents the information to the user again in the form of icons or a menu. When, for example, the icon corresponding to the information index associated with the desired program is displayed on the screen of the personal computer of the video monitor, the user performs a drag/drop operation or a similar operation to link the information index associated with the selected program with the function index associated with the "video display" function of the personal computer or the video monitor.

When the information index is linked with the function index, the information switcher performs a series of operations 1) to 3) as follows:

1) Connection is set between the information apparatus indicated by the apparatus identifier contained in the function index and the information apparatus indicated by the apparatus identifier contained in the information index. The band required for realizing the function is written in the function index and assigned to the set connection.

2) The function identifier contained in the function index is output to the information apparatus indicated by the apparatus identifier contained in the function index. The information identifier contained in the information index is output to the information apparatus indicated by the apparatus identifier contained in the information index. At this time, each information apparatus is notified of the identifier of the connection set in operation 1) so as to be contained in a message for notifying the function/information identifiers.

3) Upon reception of the information identifier, the information apparatus indicated by the information index outputs the information indicated by the information identifier to the designated connection. Upon reception of the function identifier, the information apparatus indicated by the function index starts the function designated by the function identifier, and connects the designated connection to the started function. Note that the started function receives information from the designated connection or outputs information to the connection in accordance with the type of function.

When, for example, the user is to enjoy a CATV broadcast on the personal computer or the TV set, the apparatus identifier contained in the selected function index indicates the personal computer or the video monitor, and the function identifier indicates the "video display" function. The apparatus identifier contained in the selected information index indicates the CATV module, and the information identifier indicates "currently received program". When, therefore, operations 1) to 3) described above are performed, the program received by the CATV module is displayed on the personal computer of the video monitor.

When, for example, the user is to stop enjoying the TV program, he/she must notify the information switcher of his/her intention. In order to realize this, for example, the information switcher may display icons or a menu for cancelling the function-information link on the icon or menu screen presented to the user. When the function-information link is cancelled, the information switcher releases the set connection, and notifies the information apparatuses using the connection (the CATV module and the personal computer or the video monitor) of the release of the connection. Upon reception of the notification of the release of the connection, the CATV module and the personal computer or the video monitor stop the operations of the functions using the connection. Assume that the user is enjoying the same program on a plurality of apparatuses. In this case, if the information switcher monitors the connection identifier (e.g., VPI/VCI data) contained in a function index having undergone function-information linking, the user can request only the information apparatus indicated by the apparatus identifier contained in a function index for declaring the end of the provision of the program to release the connection and stop the function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

The invention claimed is:

1. A communication method for a plurality of information apparatuses, comprising:

acquiring function index information and information index information which are associated with processes which are executable on each of a plurality of information apparatuses connected to a network to transmit the information among them, through the network, the information index information being stored in each of the information apparatuses through the network and relating to data held in the information apparatuses, and the each of the information apparatuses informing another of the information apparatuses of a way for controlling the another of the information apparatuses;

presenting the function index information and the information index information which are acquired in the acquiring; and allowing a user to link given data and a given process on the basis of the function index information and the information index information presented in the presenting, and when the given data and the given process are linked together by the user on the basis of the function index information and the information index information presented in the presenting, transmitting the given data from one of the information apparatuses which holds the given data to another of the information apparatuses which executes the process linked with the data through the network.

2. A communication method according to claim 1, wherein the presenting the function index information and the information index information presents bitmap and character information included in the acquired function and information index information.

3. A communication method of communicating among a plurality of information apparatuses, comprising:

storing function index information and information index information in each of a plurality of information apparatuses;

acquiring function index information and information index information which are associated with processes which are executable on each of the information apparatuses connected to a network to transmit the function index information among the information apparatuses, the information index information relating to data held in said information apparatuses, and the each of the information apparatuses informing another of the information apparatuses of a way for controlling the another of the information apparatuses;

presenting the function index information and the information index information acquired by the acquiring;

allowing a user to link given data and a given process on the basis of the function index information and the information index information presented in the presenting, and when the given data and the given process are linked together by the user on the basis of the function index information and the information index information presented in the presenting, setting a connection between the information apparatus holding the data and the information apparatus which executes the process linked with the data; and using the connection set in the setting to transmit the information data using a predetermined fixed length message to the information apparatus which executes the process linked with the information data.

4. A communication system for communicating among a plurality of information apparatuses, comprising:

a connector to connect a plurality of information apparatuses to a network;

a function and information index information acquiring module configured to acquire function index information and information index information which are associated with processes which are executable on each of the information apparatuses, through the network, the function index information being stored in each of the plurality of information apparatuses, the information index information relating to data held in the information apparatuses, and the each of the information apparatuses informing another of the information apparatuses of a way for controlling the another of the information apparatuses;

a function and information index information presenting module configured to present the function index information and the information index information acquired by the function and information index information acquiring module; and a transmission module configured to allow a user to link given data and a given process on the basis of the function index information and the information index information presented by the function and information index information presenting module, and when the given data and the given process are linked together by the user on the basis of the function index information and the information index information presented by the function and information index information presenting module, to transmit the given data from one of the information apparatuses which holds the given data to another of the information apparatuses which executes the process lined with data through the network.

5. A communication system according to claim 4, wherein the function and information index information presenting module includes a module configured to present bitmap and character information included in the function index information and information index information acquired by the function and information index information acquiring module.

6. A communication system for communicating among a plurality of information apparatuses, comprising:

a connector to connect the information apparatuses to a network;

a function and information index information acquiring module configured to acquire function index information and information index information which are associated with processes which are executable on each of the information apparatuses connected to the network to transmit the information among them, the function index information being transmitted over the network to be stored in each of the plurality of information apparatuses, the information index information relating data held in said information apparatuses;

a function and information index information presenting module configured to present the function index information and the information index information acquired by the function and information index information acquiring module;
a first transmission module configured to allow a user to link given data and a given process on the basis of the function index information and the information index information presented by the function and information index information presenting module and when the given data and the given process are linked together by the user on the basis of the function and information index information presented by said function and information index information presenting module, to set a connection between one of the information apparatuses which holds the data and another of the information apparatuses which executes the process linked with the data; and
a second transmission module configured to transmit the information data having a predetermined fixed length message to one of the information apparatuses which executes the process linked with the information data, using the connection set by the first transmission module.

* * * * *